(12) United States Patent
Tange et al.

(10) Patent No.: US 7,719,929 B2
(45) Date of Patent: *May 18, 2010

(54) RECORDING AND REPRODUCING APPARATUS, RECORDING AND REPRODUCING METHOD, AND STORAGE MEDIUM FOR DISPLAYING SYMBOLS AND REPRODUCING DESIRED DATA

(75) Inventors: Akira Tange, Tokyo (JP); Yoichiro Sako, Tokyo (JP); Tomihiro Nakagawa, Kanagawa (JP); Shunsuke Furukawa, Tokyo (JP); Junichi Kudo, Tokyo (JP); Kaoru Kijima, Tokyo (JP); Yoshimasa Utsumi, Tokyo (JP); Mitsuru Toriyama, Chiba (JP); Tatsuya Inokuchi, Tokyo (JP); Kazuko Sakurai, Tokyo (JP)

(73) Assignee: Sony Corporation, Tokyo (JP)

( * ) Notice: Subject to any disclaimer, the term of this patent is extended or adjusted under 35 U.S.C. 154(b) by 246 days.

This patent is subject to a terminal disclaimer.

(21) Appl. No.: 11/798,596

(22) Filed: May 15, 2007

(65) Prior Publication Data
US 2007/0285825 A1    Dec. 13, 2007

Related U.S. Application Data

(63) Continuation of application No. 10/203,402, filed as application No. PCT/JP01/10840 on Dec. 11, 2001, now Pat. No. 7,327,640.

(30) Foreign Application Priority Data
Dec. 12, 2000    (JP) .............................. 2000-377971

(51) Int. Cl.
G11B 21/08    (2006.01)
(52) U.S. Cl. ................................... 369/30.07
(58) Field of Classification Search .............. 369/30.07, 369/30.08, 30.05, 30.19, 30.23, 30.24
See application file for complete search history.

(56) References Cited

U.S. PATENT DOCUMENTS

| 5,105,401 | A | 4/1992 | Aoyagi et al. |
| 5,126,987 | A | 6/1992 | Shiba et al. |
| 5,216,644 | A | 6/1993 | Shiba et al. |
| 5,363,354 | A | 11/1994 | Tabuchi |
| 5,457,669 | A | 10/1995 | Kim et al. |

(Continued)

FOREIGN PATENT DOCUMENTS

JP    4-7598    1/1992

(Continued)

*Primary Examiner*—Tan X Dinh
(74) *Attorney, Agent, or Firm*—Finnegan, Henderson, Farabow, Garrett & Dunner, L.L.P.

(57) ABSTRACT

When the user designates the reproduction of searching audio data, the designated searching audio data and audio volume data are read from a searching data recording portion. The searching audio data is reproduced corresponding to the audio volume data. When the user designates the reproduction of main audio data, the selected audio data is read from a disc and reproduced. In addition, number-of-reproduction-times data, audio volume data, audio quality data, and time period data for the designated main audio data that are updated in the searching data storing portion. The searching audio data corresponding to the designated main audio data is read from the disc corresponding to the audio quality data and the time period data and recorded to the searching data storing portion.

12 Claims, 19 Drawing Sheets

U.S. PATENT DOCUMENTS

| | | |
|---|---|---|
| 5,557,590 A | 9/1996 | Matsumoto et al. |
| 5,751,672 A | 5/1998 | Yankowski |
| 5,880,388 A | 3/1999 | Kajiyama et al. |
| 6,091,675 A | 7/2000 | Lee |
| 6,262,951 B1 | 7/2001 | Shimizu et al. |
| 6,288,991 B1 | 9/2001 | Kajiyama et al. |
| 6,735,152 B2 | 5/2004 | Sato et al. |
| 6,813,434 B1 | 11/2004 | Noguchi et al. |
| 2002/0057297 A1* | 5/2002 | Grimes et al. ............... 345/810 |
| 2002/0065570 A1* | 5/2002 | Fujita et al. .................. 700/94 |
| 2002/0103963 A1 | 8/2002 | Denda et al. |
| 2006/0020894 A1* | 1/2006 | Ejima et al. ................. 715/721 |
| 2008/0002532 A1* | 1/2008 | Tange et al. .............. 369/30.03 |

FOREIGN PATENT DOCUMENTS

| | | |
|---|---|---|
| JP | 8-44758 | 2/1996 |

* cited by examiner

RECORDING AND REPRODUCING APPARATUS, RECORDING AND REPRODUCING METHOD, AND STORAGE MEDIUM FOR DISPLAYING SYMBOLS AND REPRODUCING DESIRED DATA

CROSS-REFERENCE TO RELATED APPLICATIONS

This is a continuation of U.S. application Ser. No. 10/203,402, filed Aug. 8, 2002 now U.S. Pat. No. 7,327,640, the contents of which are incorporated herein. U.S. application Ser. No. 10/203,402 is the U.S. National Stage of International Application No. PCT/JP01/10840, filed Dec. 11, 2001 and claims priority to Japanese Patent Application No. 2000-377971, filed Dec. 12, 2000.

TECHNICAL FIELD

The present invention relates to a recording and reproducing apparatus that uses a storage medium, in particular, to a recording and reproducing apparatus, a recording and reproducing method, and a storage medium that allow the user to search a plurality of data stored thereon for his or her desired data.

BACKGROUND ART

In recent years, a recording and reproducing apparatus that uses a storage medium can search a plurality of audio data stored in the storage medium for a user's desired audio data. For example, in the conventional recording and reproducing apparatuses, two searching methods are mainly used. In the first searching method, the user inputs a keyword corresponding to his or her desired audio data so as to designate the his or her desired audio data. In the second searching method, the user selects his or her desired audio data from data displayed on a display portion of the recording and reproducing apparatus.

However, when the number of audio data stored in the storage medium is as large as several thousand songs or several ten thousand songs and the user forgot keywords, titles thereof, or the like, he or she cannot search them for his or her desired audio data.

In addition, when titles of several thousand songs are listed on the display, since they do not appear on the display at a time, the user should scroll the screen for searching them for his or her desired title of audio data. Thus, in this searching method, a heavy burden is adversely imposed to the user.

In addition, since the user should non-intuitionally search for his or her desired data with only character information, the user should spend a long time.

Moreover, when the user searches a plurality of data on a SACD (Super Audio CD) that has a plurality of data areas for user's desired audio data, since a searching screen for each data area is not displayed, information of data areas that store data that the user does not need is displayed on the screen. Such data prevents the user from easily searching for his or her desired data. For example, when the user searches data stored in a single density area for audio CM data and a double density area for audio data for user's desired data, not only information of audio data, but also information of CM data are displayed on the searching screen. That causes the searching for user's desired data to become troublesome.

In addition, since the conventional recording and reproducing apparatus is provided with only searching modes using title name and album name, the user cannot search for his or her desired audio data using a variety of searching methods. For example, the user cannot search a storage medium for his or her desired data in a searching mode that allows data to be recommended to the user.

DISCLOSURE OF THE INVENTION

Therefore, a first object of the present invention is to provide a recording and reproducing apparatus, a recording and reproducing method, and a storage medium that allow the user to easily search a large number of audio data for his or her desired audio data without imposing a heavy burden to the user.

A second object of the present invention is to provide a recording and reproducing apparatus, a recording and reproducing method, and a storage medium that allow the user to intuitionally search for his or her desired audio data.

A third aspect of the present invention is to provide a recording and reproducing apparatus, a recording and reproducing method, and a storage medium that allow the user to search for his or her desired audio data using a variety of searching methods.

To solve the forgoing problems, the invention contemplates in one embodiment a recording and reproducing apparatus, comprising a storing means for storing partial data corresponding to a part of each of a plurality of data stored in a storage medium, a designating means for designating a desired data from the plurality of data, a reproducing means for reading partial data corresponding to data designated by the designating means and reproducing partial data, a controlling means for causing the reproducing means to successively reproduce data according to a further designation for data by the designation means, a counting means for counting a frequency of further designation, and an updating means for updating partial data stored in the storing means corresponding to the counted result.

Another embodiment of the invention is a recording and reproducing apparatus, comprising a designating means for designating a desired data from a storage medium that stores a plurality of data and partial data corresponding to a part of each of a plurality of data, a reproducing means for reading partial data corresponding to data designated by the designating means and reproducing partial data, a controlling means for causing the reproducing means to successively reproduce data as the designating means further designates data, a counting means for counting a frequency of further designation, and an updating means for updating partial data stored in the storing means corresponding to the counted result.

A further embodiment of the invention is a recording and reproducing apparatus, comprising a storing means for storing partial data corresponding to a part of each of a plurality of data stored in a storage medium, a displaying means for displaying symbols corresponding to the plurality of data, a designating means for designating a symbol displayed on the displaying means so as to designate a desired data, a reproducing means for reading partial data corresponding to the designated data from the storing means and reproducing partial data, a controlling means for causing the reproducing means to successively reproduce data according to a further designation for data by designation means, a counting means for counting the frequency of further designation, and an updating means for updating the symbol corresponding to the counted result.

Yet another embodiment of the invention is a recording and reproducing apparatus, comprising a storing means for storing partial data corresponding to a part of each of a plurality of data stored in a storage medium having a plurality of types of data areas, a displaying means for displaying symbols corresponding to the plurality of data stored in each of the data areas, a designating means for designating a symbol displayed on the displaying means so as to designate a desired data, a reproducing means for reading partial data corresponding to the designated data from the storing means and reproducing partial data, and a controlling means for causing the reproducing means to successively reproduce data according to a further designation for data by designation means.

Another embodiment of the invention is a recording and reproducing method, comprising the steps of designating a desired data from a plurality of data, reading partial data corresponding to the designated data from storing means for storing partial data corresponding to a part of each of a plurality of data stored in a storage medium and reproducing partial data, successively reproducing data according to a further designation for data, counting a frequency of further designation, and updating partial data stored in the storing means corresponding to the counted result.

Yet another embodiment of the invention is a recording and reproducing method, comprising the steps of designating a desired data from a storage medium that stores a plurality of data and partial data corresponding to a part of each of a plurality of data, reading partial data corresponding to the designated data from a storage medium and reproducing partial data, successively reproducing data according to a further designation for data, counting a frequency of further designation, and updating partial data stored in the storing means corresponding to the counted result.

A further embodiment of the invention is a recording and reproducing method, comprising the steps of displaying symbols corresponding to a plurality of data, designating a symbol that is displayed so as to designate a desired data, reading partial data corresponding to the designated data from storing means for storing partial data corresponding to a part of each of the plurality of data stored in a storage medium and reproducing partial data, successively reproducing data according to a further designation for data, counting a frequency of further designation, and updating the symbol corresponding to the counted result.

Another embodiment of the invention is a recording and reproducing method, comprising the steps of displaying symbols corresponding to a plurality of data stored in a storage medium having a plurality of types of data areas, designating a symbol that is displayed so as to designate a desired data, reading partial data corresponding to the designated data from storing means for storing partial data corresponding to a part of each of the plurality of data stored in the storage medium and reproducing partial data, and successively reproducing data according to a further designation for data.

A further embodiment of the invention is a storage medium on which a program that causes a computer to execute a recording and reproducing method is stored, the method comprising the steps of designating a desired data from the plurality of data, reading partial data corresponding to the designated data from storing means for storing partial data corresponding to a part of each of a plurality of data stored in a storage medium and reproducing partial data, successively reproducing data according to a further designation for data, counting a frequency of further designation, and updating partial data stored in the storing means corresponding to the counted result.

Another embodiment of the invention is a storage medium on which a program that causes a computer to execute a recording and reproducing method is stored, the method comprising the steps of designating a desired data from a storage medium that stores a plurality of data and partial data corresponding to a part of each of a plurality of data, reading partial data corresponding to the designated data from storage medium and reproducing partial data, successively reproducing data according to a further designation for data, counting a frequency of further designation, and updating partial data stored in the storing means corresponding to the counted result.

A further embodiment of the invention is a storage medium on which a program that causes a computer to execute a recording and reproducing method is stored, the method comprising the steps of displaying symbols corresponding to a plurality of data, designating a symbol that is displayed so as to designate a desired data, reading partial data corresponding to the designated data from storing means for storing partial data corresponding to a part of each of the plurality of data stored in a storage medium and reproducing partial data, successively reproducing data according to a further designation for data, counting a frequency of further designation, and updating the symbol corresponding to the counted result.

Yet another embodiment of the invention is a storage medium on which a program that causes a computer to execute a recording and reproducing method is stored, the method comprising the steps of displaying symbols corresponding to a plurality of data stored in a storage medium having a plurality of types of data areas, designating a symbol that is displayed so as to designate a desired data, reading partial data corresponding to the designated data from storing means for storing partial data corresponding to a part of each of the plurality of data stored in the storage medium and reproducing partial data, and successively reproducing data according to a further designation for data.

As was described above, according to the present invention, the recording and reproducing apparatus has a storing means that stores partial data corresponding to a part of each of a plurality of data stored in a storage medium and number-of-reproduction-times data. When the user designates his or her desired data, partial data corresponding to the designated data is read from the storing means and reproduced. When the user designates the continuation of the reproduction, data is read for the storage medium and the reproduction of data is continued. In addition, the number-of-reproduction-times data of data designated by the user is updated. Data stored in the storing means are partly updated corresponding to the number-of-reproduction-times data. Thus, the user can easily search the plurality of data stored in the storage medium for his or her desired data while reproducing them.

In addition, according to the present invention, the storage medium stores a plurality of data, partial data corresponding to a part of each of the plurality of data, and number-of-reproduction-times data. When the user designates the reproduction of his or her desired data, the recording and reproducing apparatus reads partial data corresponding to the designated data from the storage medium and reproduces partial data. When the user designates the continuation of the reproduction, data corresponding to the designated partial data is read from the storage medium and the reproduction is continued. The number-of-reproduction-times of data designated by the user is updated. In addition, data stored in the storing portion are partly updated corresponding to the number-of-reproduction-times data. Thus, the user can easily search the plurality of data stored in the storage medium for his or her desired data while reproducing them.

In addition, according to the present invention, the recording and reproducing apparatus has a storing means that stores partial data corresponding to a part of each of a plurality of data stored in the storage medium and number-of-reproduction-times data. Symbols corresponding to the plurality of data stored in the storage medium are displayed corresponding to the number-of-reproduction-times data stored in the storing means. When the user designates a symbol that is displayed, partial data corresponding to the symbol is read from the storing means and partial data that is read from the storing means is reproduced. When the user designates the reproduction, data is read and the reproduction is continued. In addition, the number-of-reproduction-times data stored in the storing means is updated. Thus, the user can easily search the plurality of data stored in the storage medium for his or her desired data using symbols that are displayed.

In addition, according to the present invention, the recording and reproducing apparatus has a storing means that stores partial data corresponding to a part of each of a plurality of data stored in the storage medium that has a plurality of types of data areas. Symbols corresponding to data stored in the storage medium are displayed for each data area. When the user designates a symbol that is displayed, partial data corresponding to the designated symbol is read from the storing means and reproduced. When the user designates a symbol, data corresponding to the designated symbol is read and the reproduction is continued. Thus, the user can easily search a large number of data stored in the storage medium for his or her desired data.

BEST MODES FOR CARRYING OUT THE INVENTION

Figure 1:
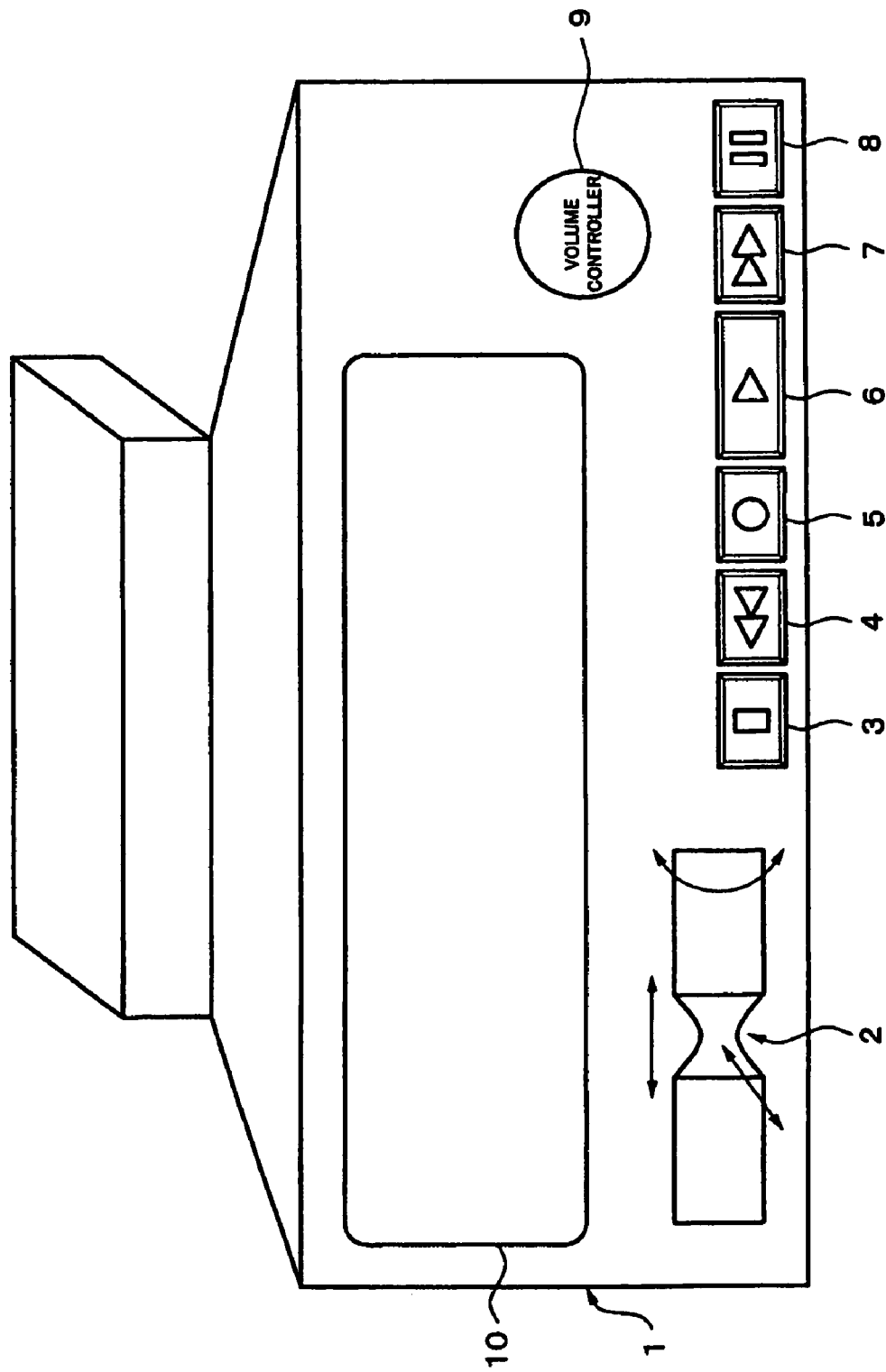
FIG. 1 is a schematic diagram showing an external view of a recording and reproducing apparatus according to a first embodiment of the present invention.

Next, with reference to the accompanying drawings, embodiments of the present invention will be described. FIG. 1 shows an appearance of a recording and reproducing apparatus according to a first embodiment of the present invention. The recording and reproducing apparatus comprises a three-dimensional jog 2, a stop button 3, a rewind button 4, a record button 5, a reproduction button 6, a fast forward button 7, a pause button 8, a volume controller 9, a display portion 10, and a power switch (not shown) that are disposed on a front panel portion 1.

Figure 2:
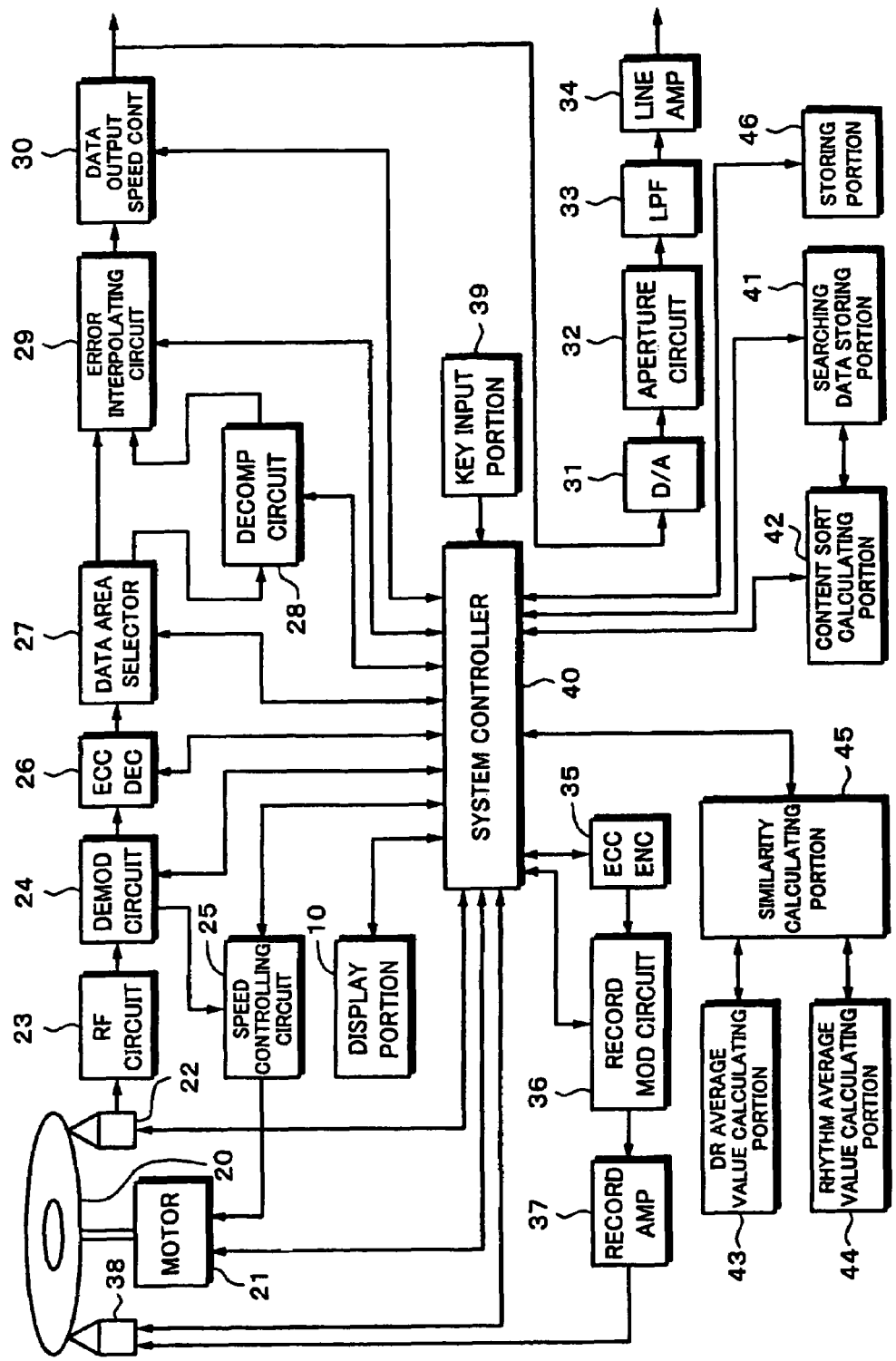
FIG. 2 is a block diagram showing an example of the structure of the recording and reproducing apparatus according to the first embodiment of the present invention.

FIG. 2 is a block diagram showing an example of the structure of the recording and reproducing apparatus according to the first embodiment of the present invention. A disc 20 has a plurality of data areas. According to the first embodiment, the disc 20 has two data areas that are for example a single density area and a double density area. In the single density area, for example PCM (Pulse Code Modulation) data is stored. In the double density area, for example compressed data is stored. Examples of the data compressing system is MP3 (MPEG-1 Audio Layer III), ATRAC (Adaptive Transform Acoustic Cording), and AAC (Advanced Audio Cording). In this example, data stored in the disc 20 are audio data.

Information about data stored in the disc 20 is displayed on the display portion 10 corresponding to data supplied from a searching data storing portion 41, a storing portion 46, or the like. A panel portion of the display portion 10 is for example a touch panel. When the user touches the panel portion of the display portion 10, he or she can select information displayed on the display portion 10 and move a pointer displayed on the display portion 10.

The disc 20 is rotated and driven by a spindle motor 21. Data stored in the disc 20 is read by an optical head 22. The data that is read from the disc 20 is supplied to a demodulating circuit 24 through an RF circuit 23.

The demodulating circuit 24 demodulates the data supplied from the RF circuit 23 and supplies the demodulated data to a speed controlling circuit 25 and an ECC decoder 26. In addition, information about TOC (Table Of Contents) of the demodulated data that is output from the demodulating circuit 24 is supplied to a system controller 40. The system controller 40 uses the information about the TOC for various controlling operations.

The speed controlling circuit 25 controls the speed of the disc 20 corresponding to the data supplied from the demodulating circuit 24 (for example, at constant linear velocity).

The ECC decoder 26 performs an error correcting process using CIRC (Cross Interleave Reed-Solomon code) and supplies the error-corrected audio PCM data or compressed data to a data area selector 27. The ECC decoder 26 places an error flag to data whose error could not be corrected and supplies the error-flagged data to the data area selector 27.

The data area selector 27 determines whether the data supplied from the ECC decoder 26 is data stored in the single density area of the disc 20 or data stored in the double density area thereof (namely, the data is PCM data or compressed data). When the determined result represents that the data supplied from the ECC decoder 26 is PCM data, the data is supplied to an error interpolating circuit 29. When the determined result represents that the data supplied from the ECC decoder 26 is compressed data, the data is supplied to a decompressing circuit 28.

The decompressing circuit 28 decompresses the compressed data supplied from the data area selector 27 and supplies the decompressed data to the error interpolating circuit 29. The error interpolating circuit 29 checks whether the error flag has been placed on the data supplied from the data area selector 27 and the decompressing circuit 28. The error interpolating circuit 29 performs an error interpolating process for audio data with an error that has not been corrected. The error interpolating circuit 29 performs the error interpolating process for data with an error using data preceded thereby and data followed thereby. The error interpolating circuit 29 supplies the error-corrected data to a data output speed controlling circuit 30.

The data output speed controlling circuit 30 is provided with a buffer memory. In the data output speed controlling circuit 30, data supplied from the error interpolating circuit 29 is buffered to the buffer memory so that the data is output at a required data speed (for example, 1.4112 Mbps).

Digital data that is supplied from the data output speed controlling circuit 30 is output through a digital output terminal (not shown) to the outside of the apparatus. In addition, the digital data is supplied to a D/A converter 31. The D/A converter 31 converts the digital data supplied from the data output speed controlling circuit 30 into an analog audio signal. The analog audio signal is output from an analog output terminal (not shown) through an aperture circuit 32, a low pass filter 33, and a line amplifier 34.

An ECC encoder 35 performs an error correcting encoding process for the input data supplied from the ECC decoder 26 using for example CIRC and supplies the processed data to a record modulating circuit 36.

The record modulating circuit 36 modulates the data supplied from the ECC encoder 35 using EFM (Eight-to-Fourteen Modulation) system and supplies the modulated data to a record head 38 through a record amplifier 37.

The record head 38 forms pits on the disc 20 corresponding to the data supplied through the record amplifier 37 and records the audio data on the disc 20. When the recording and reproducing apparatus is not used for authoring system, but a consumer system, the record head 38 may be of type of which light reflectivity is varied on the disc 20.

An input portion 39 is provided with a three-dimensional jog 2, a stop button 3, a rewind button 4, a record button 5, a reproduction button 6, a fast forward button 7, a pause button 8, a volume controller 9, and a power switch (not shown).

The searching data storing portion 41 is composed of for example a non-volatile memory or a magnetic hard disk. The searching data storing portion 41 stores searching data. Examples of the searching data are searching audio data, number-of-reproduction-times data, audio volume data, audio quality data, time period data, additional information, and evaluation value. The searching audio data is partial data of a part of audio data stored in the disc 20. In more reality, the searching audio data is data of a beginning portion or a bridge portion of a program of audio data stored in the disc 20. The additional information is for example data such as artist name, album name, song title, and jacket image corresponding to each audio data stored in the disc 20. The evaluation value is used to evaluate the similarity of audio data having the highest searching reproducing frequency and other audio data.

A content sort calculating portion 42 decides audio data having the highest reproducing frequency corresponding to the number-of-reproduction-times data stored in the searching data storing portion 41 under the control of the content sort calculating portion 42.

A DR average value calculating portion 43 calculates a DR average value at each predetermined interval (namely, a parameter that represents the size of an average amplitude of audio data) under the control of the system controller 40.

A rhythm average value calculating portion 44 calculates a rhythm average value (namely, all the average value of peak intervals in a predetermined band of audio data) under the control of the system controller 40. In this example, the rhythm average value is a parameter that represents a pitch or speed of beat in a narrow sense. Alternatively, the rhythm average value may be obtained by calculating an average value of zero crossing intervals.

A similarity calculating portion 45 compares parameters (DR average value and rhythm average value) of audio data having the highest reproducing frequency and those of other audio data and obtains the similarity between audio data having the highest reproducing frequency and each of other audio data. In reality, the similarity calculating portion 45 calculates (difference between DR average values+difference between average values of peak intervals) and outputs the resultant value as the evaluation value. As the evaluation value is smaller, the similarity of audio data with audio data having the highest reproducing frequency is higher. Alternatively, the inverse number of (difference between DR average values+difference between average values of peak intervals) may be calculated as the evaluation value. In this case, as the evaluation value is larger, the similarity of audio data with audio data having the highest reproducing frequency is higher.

A storing portion 46 stores for example information about a searching screen displayed on the display portion 10. The system controller 40 controls each of the foregoing portions.

Figure 3:
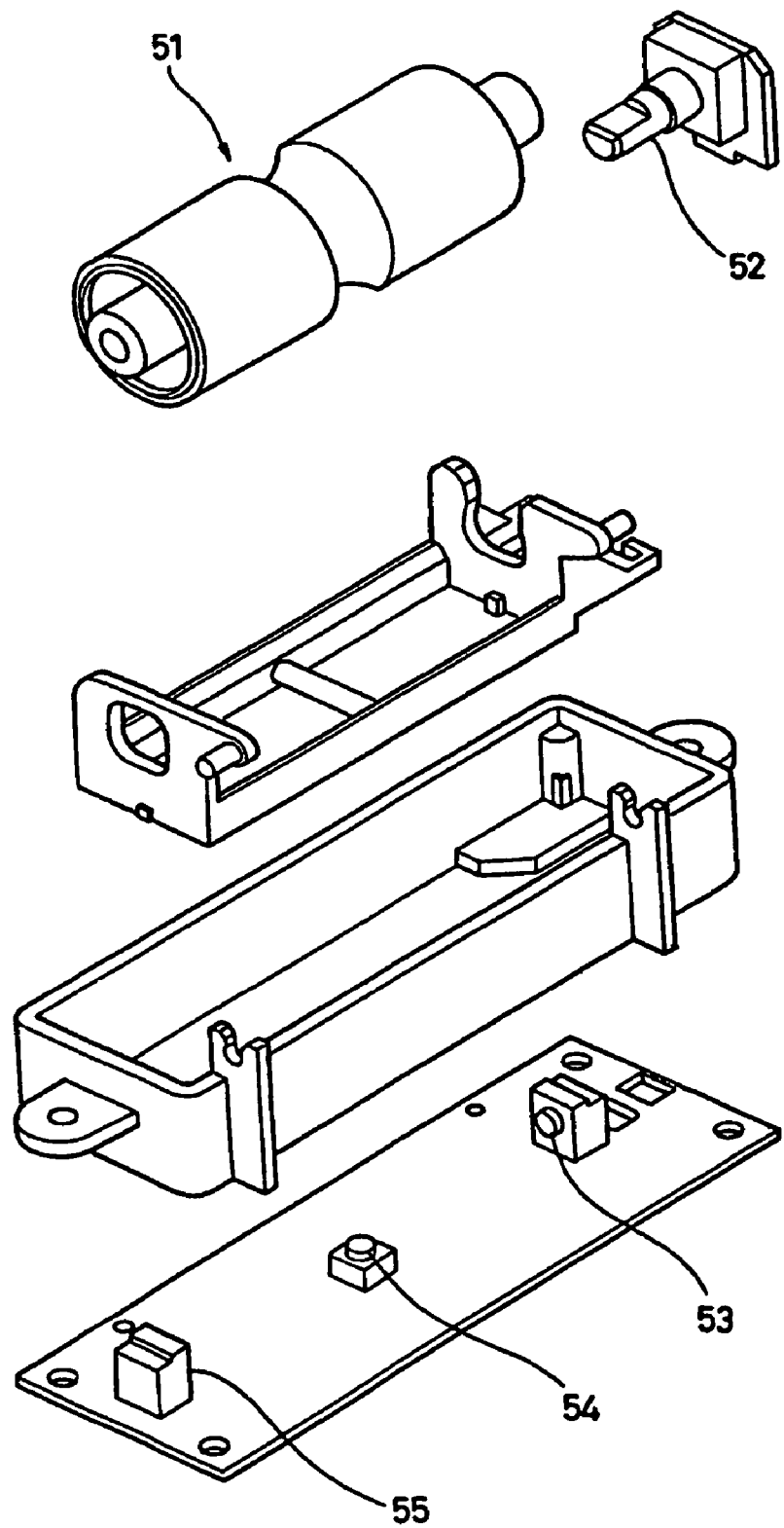
FIG. 3 is a perspective view showing an outlined structure of a 3D jog according to the first embodiment of the present invention.
Figure 4A:
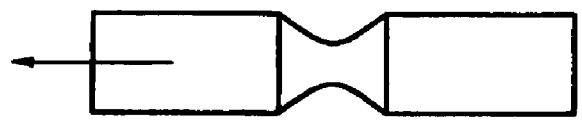
FIG. 4 is a schematic diagram for explaining an operating method of the 3D jog according to the first embodiment of the present invention.
Figure 4B:
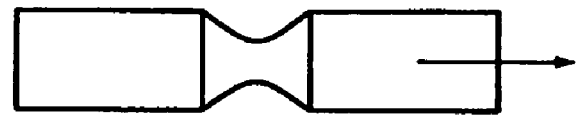
Figure 4C:
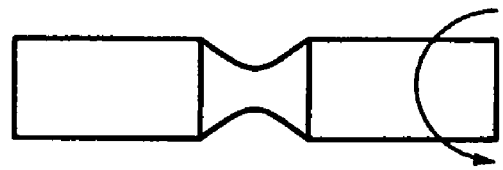
Figure 4D:
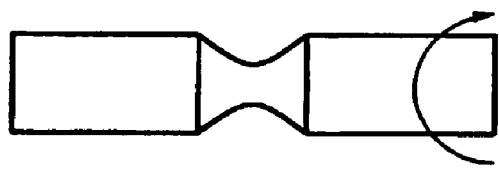
Figure 4E:
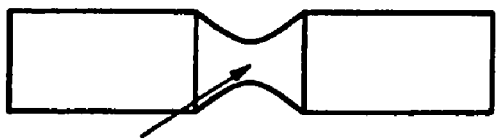

FIG. 3 is a perspective view showing an outlined structure of the 3D jog. The 3D jog is provided with a rotary encoder 52 and tact switches 53, 54, and 55. The rotary encoder 52 outputs a signal corresponding to the rotation of a three-dimensional jog stick 51. The tact switches 53, 54, and 55 are turned on/off corresponding to the motion of the three-dimensional jog stick 51. When the three-dimensional jog stick 51 is moved as shown in FIG. 4A, the tact switch 55 is turned on. When the three-dimensional jog stick 51 is moved as shown in FIG. 4B, the tact switch 53 is turned on. When the three-dimensional jog stick 51 is rotated forward as shown in FIG. 4C, a signal corresponding to the forward rotation of the three-dimensional jog stick 51 is output from the rotary encoder 52. When the three-dimensional jog stick 51 is rotated in the backward direction as shown in FIG. 4D, a signal corresponding to the backward direction of the three-dimensional jog stick 51 is output from the rotary encoder 52. When the three-dimensional jog stick 51 is pressed as shown in FIG. 4E, the tact switch 54 is turned on. The user can perform operations for searching for data stored in the disc 20 and reproducing the obtained data with only the three-dimensional jog 2.

Figure 5:
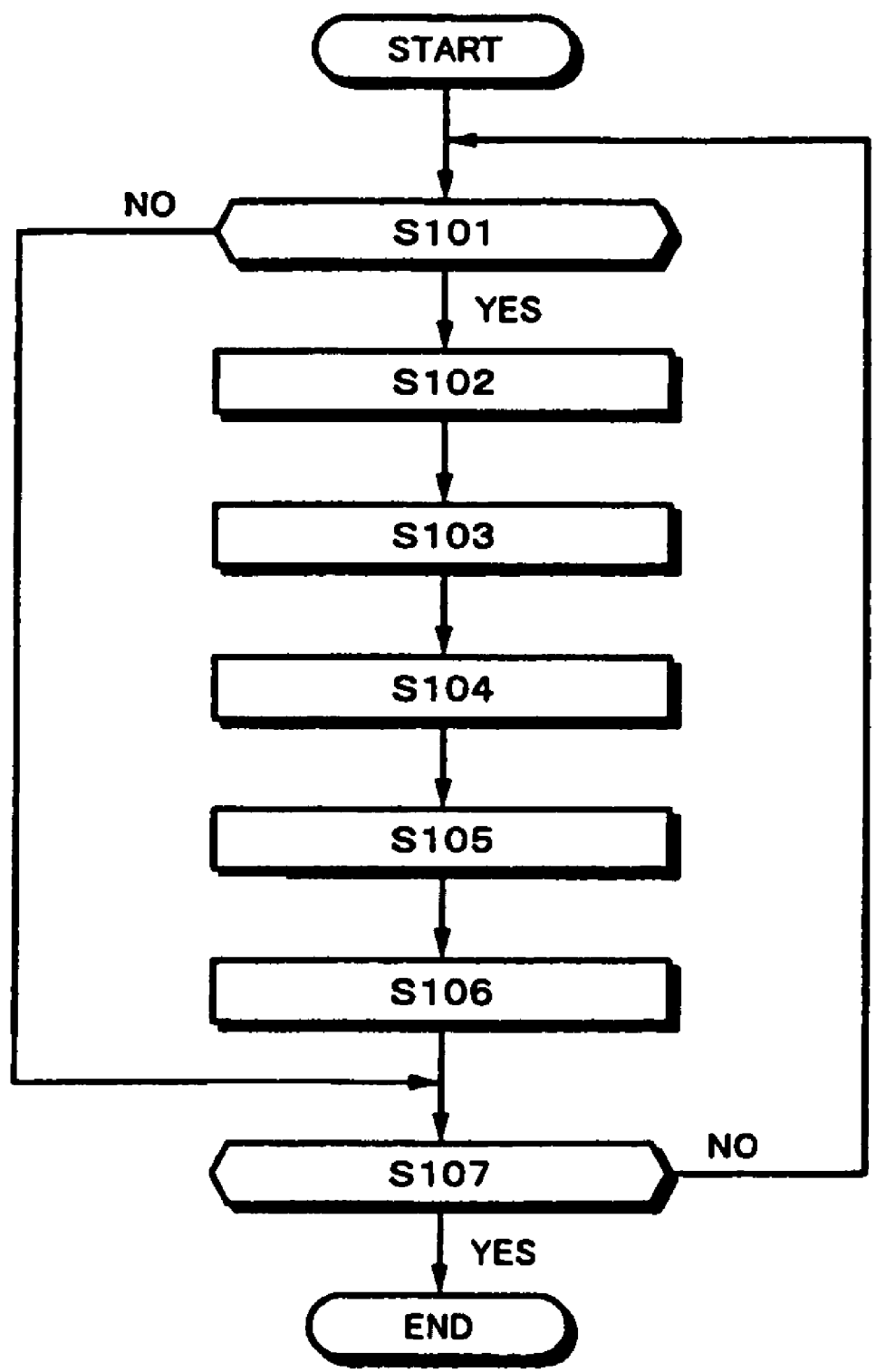
FIG. 5 is a flow chart for explaining a process for changing searching audio data corresponding to a reproducing frequency of audio data according to the first embodiment of the present invention.

FIG. 5 is a flow chart for explaining a process for changing searching audio data corresponding to the reproducing frequencies of audio data.

At step 101, the system controller 40 determines whether or not a reproducing command for a predetermined audio data has been issued corresponding to a signal supplied from the input portion 39. When the determined result represents that the reproducing command has been issued, the flow advances to step 102. When the determined result represents that the reproducing command has not been issued, the flow advances to step 107.

At step 102, the system controller 40 increments the number-of-reproduction-times data of the ID of the audio data corresponding to the reproducing command in searching data stored in the searching data storing portion 41 and the double density area of the disc 20.

At step 103, the system controller 40 updates the audio volume data of the ID of audio data corresponding to the reproducing command in searching data stored in the searching data storing portion 41 and the double density area of the disc 20. In this example, the audio volume data is updated so that it becomes higher in the order of for example higher reproducing frequencies of audio data. Alternatively, the audio volume data may be updated so that it becomes lower in the order of higher reproducing frequencies of audio data.

At step 104, the system controller 40 updates the audio quality data of the ID of searching audio data corresponding to the reproducing command in searching audio data stored in the searching data storing portion 41 and the double density area of the disc 20. In this case, the audio quality data of searching audio data is updated so that the sampling frequencies of searching audio data become lower in the order of higher reproducing frequencies of searching audio data. Thus, as the reproducing frequencies of searching audio data are higher, searching audio data are reproduced with higher audio qualities. Alternatively, audio quality data may be updated so that as the reproducing frequencies of searching audio data are higher, the sampling frequencies of searching frequencies become higher. In this case, as the reproducing frequencies of searching audio data are higher, searching audio data may be reproduced with lower audio qualities.

At step 105, the system controller 40 updates the time period data of the ID of searching audio data corresponding to the reproducing command in searching data stored in the searching data storing portion 41 and the double density area of the disc 20. The time period data is updated so that as the reproducing frequencies are higher, the reproduction time periods becomes longer. Alternatively, the time period data may be updated so that as the reproducing frequencies are higher, the reproduction time periods become shorter. This is because the user has often listen to songs that have higher reproducing frequencies, he or she can recognize songs when they have higher reproducing frequencies in shorter reproduction time periods.

At step 106, the system controller 40 reads searching audio data of the ID corresponding to the reproducing command with the audio quality data and the time period data from the disc 20 and stores the obtained searching audio data to the searching data storing portion 41 and the double density area of the disc 20.

At step 107, the system controller 40 determines whether or not the power off operation has been performed corresponding to a signal supplied from the input portion 39. When the determined result represents that the power off operation has not been performed, the flow advances to step 101. When the determined result represents that the power off operation has been performed, the process is completed.

Figure 6:
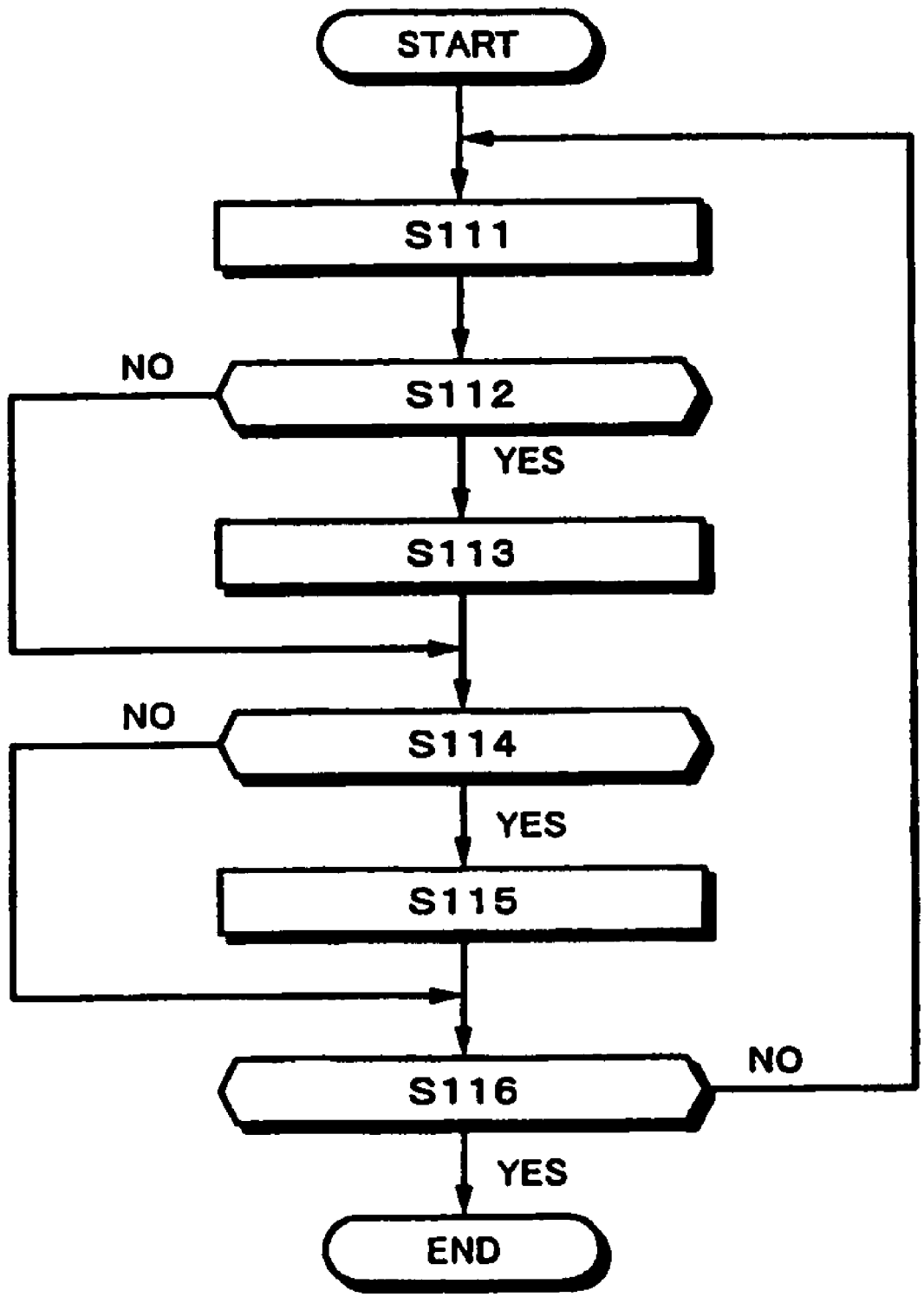
FIG. 6 is a flow chart for explaining the operation and process of a system controller that searches for audio data and reproduces the searched data according to the first embodiment of the present invention.

FIG. 6 is a flow chart for explaining operations of the system controller 40 that searches for audio data and reproduces the obtained audio data.

At step 111, the system controller 40 determines what audio data the user has selected corresponding to a signal supplied from the input portion 39. Thereafter, the system controller 40 reads searching audio data and audio volume data from for example the searching data storing portion 41 corresponding to the ID of data selected by the user. The system controller 40 controls searching audio data corresponding to the audio volume data and reproduces the controlled searching audio data.

At step S112, the system controller 40 determines whether or not the user has issued a selected audio data changing command corresponding to a signal supplied form the input portion 39. When the determined result represents that the user has issued the selected audio data changing command, the flow advances to step S113. When the determined result represents that the user has not issued the selected audio data changing command, the flow advances to step S114.

At step S113, the system controller 40 reads searching audio data and audio volume data of the ID of the new data from for example the searching data storing portion 41. The system controller 40 controls searching audio data corresponding to the audio volume data and reproduces the controlled searching audio data.

At step S114, the system controller 40 determines whether or not the user has issued a reproducing command corresponding to a signal supplied from the input portion 39. When the determined result represents that the user has issued the reproducing command, the flow advances to step S115. When the determined result represents that the user has not issued the reproducing command, the flow advances to step S116.

At step S115, the system controller 40 successively reads audio data corresponding to the ID of the selected audio data from the disc 20 and reproduces the audio data. In reality, the system controller 40 reproduces audio data (the main audio data) recorded on the disc 20 seamlessly preceded by searching audio data. When searching audio data stored in the searching data storing portion 41 is audio data of the beginning portion or the bridge portion of audio data stored in the disc 20, the system controller 40 directly reads audio data of the ID of the selected audio data from the disc 20 and seamlessly reproduce audio data. When searching audio data stored in the searching data storing portion 41 is audio data of the beginning portion or the bridge portion of audio data stored in the disc 20, the system controller 40 reads searching audio data of the ID of the selected data from the searching data storing portion 41 and reproduces audio data. In addition, the system controller 40 reads audio data corresponding to the ID of the selected audio data from the disc 20 and temporarily writes audio data to the searching data storing portion 41. Thereafter, the system controller 40 reads audio data from the searching data storing portion 41 and seamlessly reproduces audio data. In other words, the searching data storing portion 41 may be used in common with a shock proof memory.

When required, the system controller 40 may reproduce audio data stored in the disc 20 from the beginning. In this case, when searching audio data stored in the searching data storing portion 41 is a beginning portion or a bridge portion of audio data stored in the disc 20, the system controller 40 directly reads audio data of the selected ID from the disc 20 and reproduces audio data from the beginning. When searching audio data stored in the searching data storing portion 41 is audio data of a beginning portion or a bridge portion of audio data stored in the disc 20, the system controller 40 reads searching audio data of the selected ID from the searching data storing portion 41 and reproduces the audio data. In addition, the system controller 40 reads audio data of the selected ID from the disc 20 and temporarily writes audio data to the searching data storing portion 41. Thereafter, the system controller 40 reads audio data from the searching data storing portion 41 and reproduces audio data from the beginning. In other words, the searching data storing portion 41 may be used in common with a shock proof memory.

At step S116, the system controller 40 determines whether or not the user has performed a power off operation corresponding to a signal supplied from the input portion 39. When the determined result represents that the user has performed the power off operation, the process is completed. In contrast, when the determined result represents that the user has not performed the power off operation, the flow returns to step 111. At step 111, the foregoing process is repeated. In other words, at step 111, the selected audio data is repeatedly reproduced.

As was described above, when audio data are searched and reproduced, the audio volumes, audio qualities, and reproduction time periods of searching audio data are controlled corresponding to the reproducing frequencies. Thus, the user can intuitively search for his or her desired audio data.

In addition, since searching audio data are recorded to both the disc 20 that stores main audio data and the searching data storing portion 41 of the recording and reproducing apparatus, when searching audio data stored in the searching data storing portion 41 of the recording and reproducing apparatus are changed or when the recording and reproducing apparatus is changed to another apparatus and audio data on the disc 20 are reproduced by the changed recording and reproducing apparatus, searching data stored in the disc 20 can be used. Thus, the user can search audio data in his or her suitable searching method.

In the foregoing example, the reproduction audio volume, reproduction audio quality, and reproduction time period are controlled corresponding to the reproducing frequencies of audio data. However, the present invention is not limited to such an example. In other words, as shown in FIG. 2, a content sort calculating portion 42, a DR average value calculating portion 43, a rhythm average value calculating portion 44, and a similarity calculating portion 45 may be disposed. In the structure, corresponding to the DR average value, the rhythm average value, or the similarity of audio data having the highest reproducing frequency, the reproduction audio volume, reproduction audio quality, and reproduction time period of each audio data are controlled. Corresponding to the controlled reproduction audio volume, reproduction audio quality, and reproduction time period, each audio data is reproduced.

Next, a recording and reproducing apparatus according to a second embodiment of the present invention will be described. According to the first embodiment, searching audio data are reproduced corresponding to the reproduction audio volumes, reproduction audio qualities, and reproduction time periods and they are searched for desired audio data.

In contrast, according to the second embodiment, an example of which audio data are searched for a desired audio data using symbols displayed on the display portion 10 will be described. The appearance and structure of the recording and reproducing apparatus according to the second embodiment are the same as those according to the first embodiment. Thus, their description will be omitted.

According to the second embodiment of the present invention, the storing portion 46 stores information about font points of symbols displayed on the display portion 10, information about display positions of the symbols, and information about the number of songs.

Figure 7:
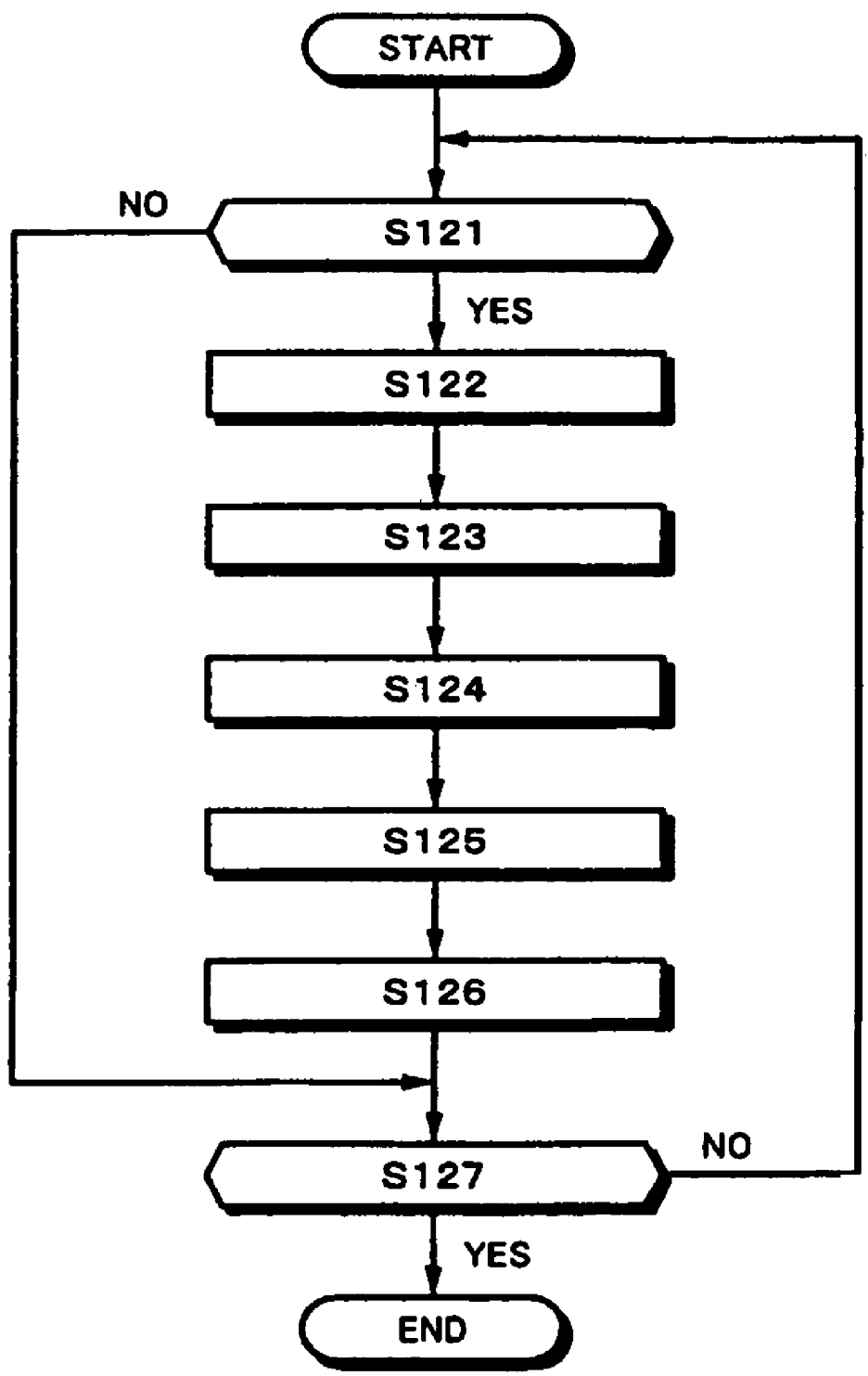
FIG. 7 is a flow chart for explaining a calculating process for calculating the similarity of audio data that has the highest reproducing frequency and other audio data according to a second embodiment of the present invention.

FIG. 7 is a flow chart for explaining a process for calculating the similarity of audio data having the highest reproducing frequency and another audio data.

At step S121, the system controller 40 determines whether or not the user has issued a reproducing command corresponding to a signal supplied from the input portion 39. When the determined result represents that the user has issued the reproducing command, the flow advances to step S122. When the determined result represents that the user has not issued the reproducing command, the flow advances to step S127.

At step S122, the system controller 40 increments the number-of-reproduction-times data of the ID of audio data corresponding to the reproducing command in searching data stored in the searching data storing portion 41 and the double density area of the disc 20.

At step S123, the content sort calculating portion 42 decides audio data having the highest reproducing frequency corresponding to the number-of-reproduction-times data stored in the searching data storing portion 41 under the control of the system controller 40.

At step S124, the system controller 40 controls the DR average value calculating portion 43 through the similarity calculating portion 45. The DR average value calculating portion 43 calculates a DR average value of all audio data under the control of the system controller 40. In this example, the calculated DR average value of all audio data may be stored in the searching data storing portion 41.

At step S125, the system controller 40 controls the rhythm average value calculating portion 44 through the similarity calculating portion 45. The rhythm average value calculating portion 44 calculates the rhythm average value of all audio data under the control of the system controller 40. In this example, the calculated rhythm average value of all audio data may be stored in for example the searching data storing portion 41.

At step 126, the similarity calculating portion 45 calculates the similarity of audio data that has the highest reproducing frequency and another audio data and stores the calculated similarity to the searching data storing portion 41 corresponding to the ID of audio data.

At step S127, the system controller 40 determines whether or not the user has turned off the power corresponding to a signal supplied from the input portion 39. When the determined result represents that the user has not turned off the power, the flow returns to step S121. When the determined result represents that the user has turned off the power, the process is completed.

In the foregoing similarity calculating process, at steps S124 and S125, the DR average value and the rhythm average value are calculated. However, when the calculated result has been stored in the searching data storing portion 41, the calculations at steps S124 and S125 may not be performed.

Figure 8:
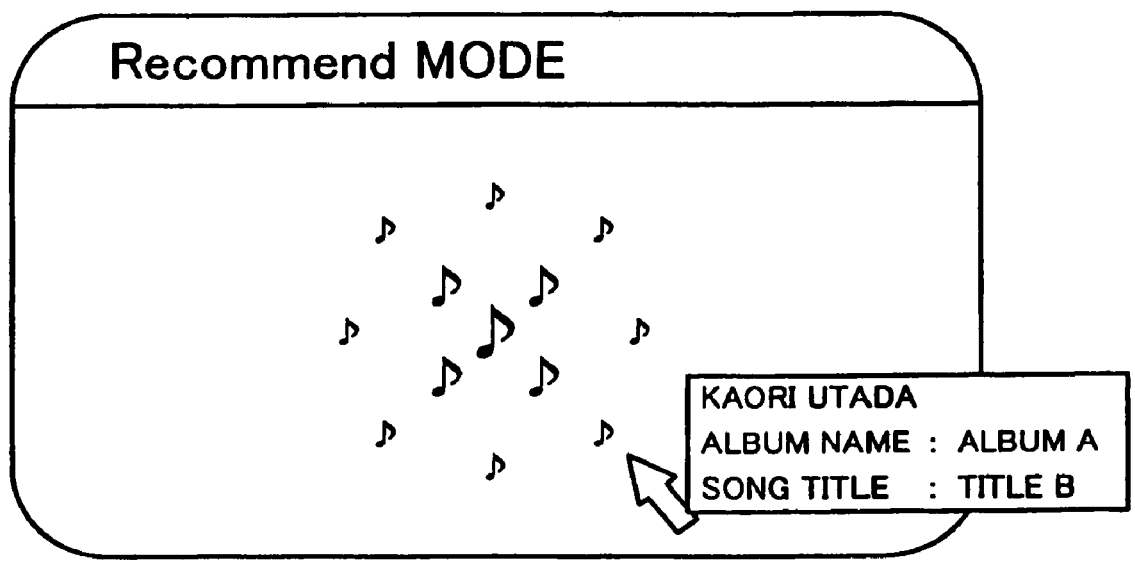
FIG. 8 is a schematic diagram showing an example of a display screen in a recommend mode according to the second embodiment of the present invention.

FIG. 8 is an example of a display screen of a recommend mode in which the user can know the similarities of songs with symbols. In this example, the symbols are represented with for example eighth notes. The symbols displayed on the display portion 10 correspond to songs of audio data. The size of each symbol depends on the similarity of the corresponding song and a song having the highest reproduction similarity.

Figure 9:
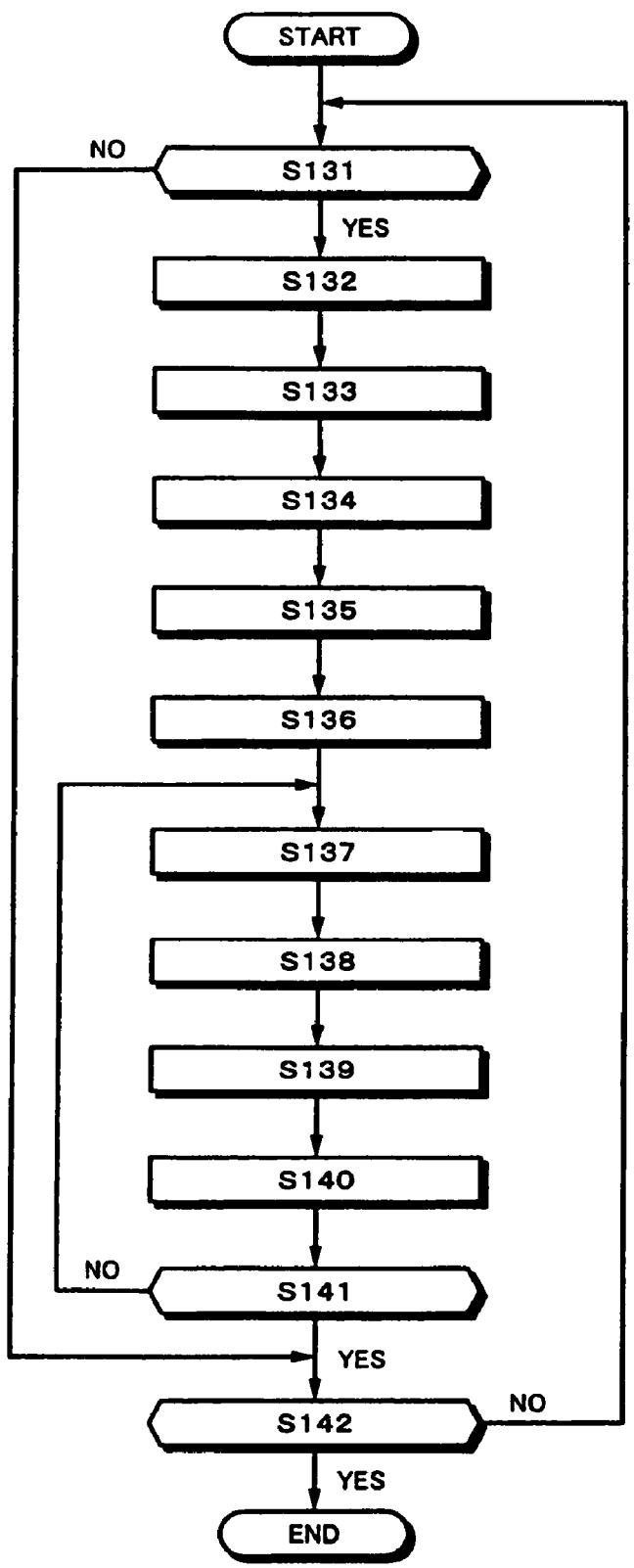
FIG. 9 is a flow chart for explaining a symbol displaying process of a display screen in the recommend mode according to the second embodiment of the present invention.

FIG. 9 is a flow chart for explaining a symbol displaying process on the display screen in the recommend mode shown in FIG. 8.

At step S131, the system controller 40 determines whether or not the user has designated the recommend mode corresponding to a signal supplied from the input portion 39. When the determined result represents that the user has designated the recommend mode, the flow advances to step S132. When the determined result represents that the user has not designated the recommend mode, the flow advances to step S142.

At step S132, the system controller 40 sets a font point stored in the storing portion 46 to A.

At step S133, the system controller 40 sets coordinate data stored in the storing portion 46 to (C, D). In this example, the coordinate data (C, D) is coordinate data of the center position of the display portion 10.

At step S134, the display portion 10 displays information about symbol indication supplied from the storing portion 46 under the control of the system controller 40. In other words, the display portion 10 displays a symbol with the font point A and the symbol coordinate data (C, D).

At step S135, the system controller 40 reads searching audio data having the highest reproducing frequency and the start address from the disc 20 and stores the searching data to the searching data storing portion 41 corresponding to the symbol.

At step S136, the system controller 40 stores the value of which 1 is subtracted from the number of all songs stored on the disc 20 (the value is referred to the number of remaining songs) to the storing portion 46.

At step S137, the system controller 40 updates data about the symbol indication stored in the storing portion 46. In other words, the system controller 40 updates the font point A and the coordinate data (C, D). The system controller 40 updates the font point A to for example A−1. The system controller 40 updates the coordinate data (C, D) to a position rotated by a predetermined angle while the distance from the center position of the display portion 10 is kept. Alternatively, the system controller 40 updates the coordinate data (C, D) to a position apart from the center position of the display portion 10 by a predetermined distance.

At step S138, the display portion 10 displays a symbol with information supplied from the storing portion 46 under the control of the system controller 40. In other words, the display portion 10 displays a symbol with the font point A and the symbol coordinate data (C, D).

At step S139, the system controller 40 reads audio data having the highest reproducing frequency and the start address of audio data having the next highest reproducing frequency from the disc 20 corresponding to the similarities stored in the searching data storing portion 41 and stores data and the start address to the searching data storing portion 41 corresponding to the symbol.

At step S140, the system controller 40 subtracts 1 from the number of remaining songs stored in the storing portion 46. In other words, the system controller 40 subtracts 1 from the number of remaining songs stored in the storing portion 46 and stores the resultant value as the number of remaining songs to the storing portion 46.

At step S141, the system controller 40 determines whether or not the number of remaining songs is equal to or smaller than 0. When the number of remaining songs is 0 or larger, the flow returns to step S137. At step S137, the system controller 40 performs the similar process. In other words, the system controller 40 performs a symbol displaying process corresponding to the similarity. In contrast, when the determined result represents that the number of remaining songs is smaller than 0, the flow advances to step S142.

At step S142, the system controller 40 determines whether or not the user has turned off the power corresponding to a signal supplied from the input portion 39. When the determined result represents that the user has not turned off the power, the flow returns to step S131. When the determined result represents that the user has turned off the power, the process is completed.

Figure 10:
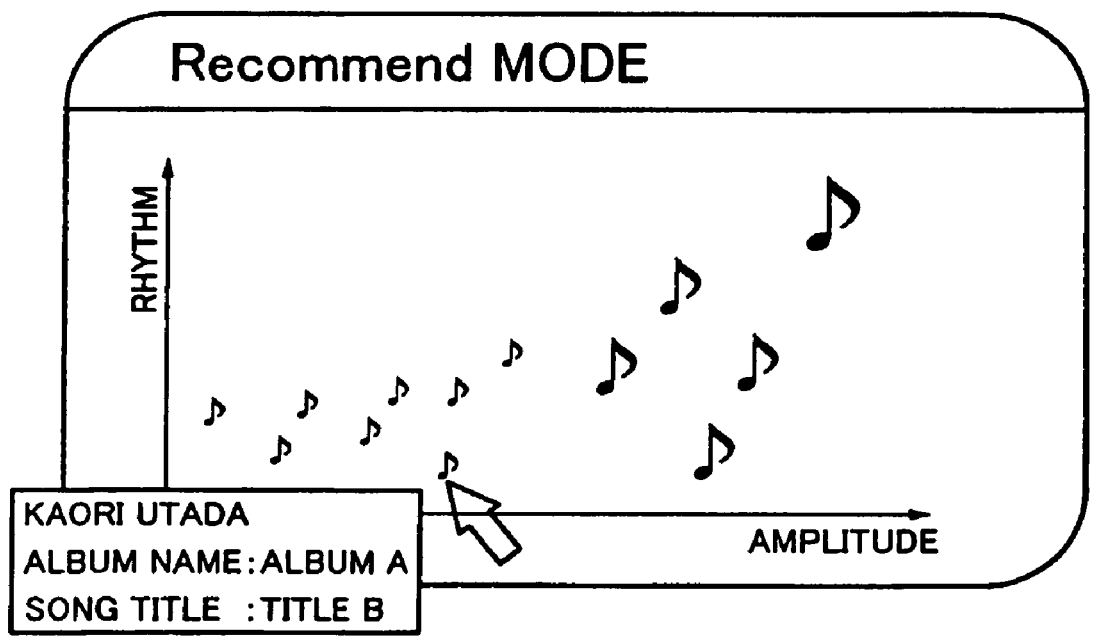
FIG. 10 is a schematic diagram showing an example of a display screen in the recommend mode according to the second embodiment of the present invention.

FIG. 10 shows another example of the display screen in the recommend mode of which the user can know the similarities of songs with symbols. In this example, the symbols are represented with eighth notes. Symbols displayed on the display portion 10 correspond to audio data stored in the disc 20. The size of each symbol depends on the similarity of each data and data having the highest reproducing frequency. The position of each symbol depends on the similarity of the amplitude and rhythm of the corresponding to audio data and those of audio data having the highest reproducing frequency.

Figure 11:
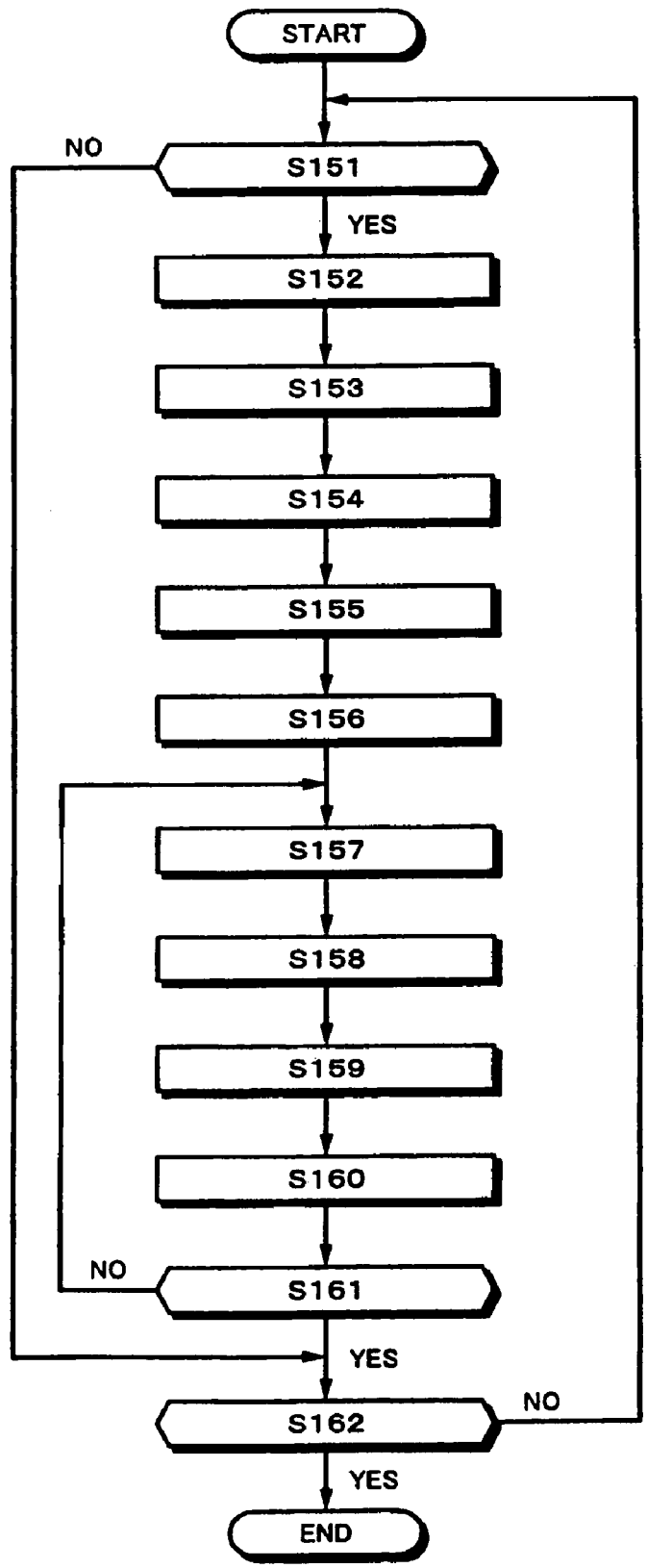
FIG. 11 is a flow chart for explaining a symbol displaying process of a display screen in the recommend mode according to the second embodiment of the present invention.

FIG. 11 is a flow chart for explaining a symbol displaying process on the display screen in the recommend mode shown in FIG. 10.

At step S151, the system controller 40 determines whether or not the user has designated the recommend mode corresponding to a signal supplied from the input portion 39. When the determined result represents that the user has designated the recommend mode, the flow advances to step S152. In contrast, When the determined result represents that the user has not designated the recommend mode, the flow advances to step S162.

At step S152, the system controller 40 stores a font point A of a symbol to the storing portion 46.

At step S153, the system controller 40 stores coordinate data (C, D) to the storing portion 46. The coordinate data (C, D) is coordinate data of a graph having an amplitude axis and a rhythm axis displayed on the display portion 10. In this example, the coordinate data (C, D) is (maximum value of coordinate of amplitude axis, maximum value of coordinate of rhythm axis). Alternatively, the symbol coordinate data (C, D) may be the amplitude value and the rhythm value of audio data that has the highest reproducing frequency.

At step S154, the display portion 10 displays a symbol with information supplied from the storing portion 46 under the control of the system controller 40. In other words, the display portion 10 displays a symbol with the font point A and the coordinate data (C, D).

At step S155, the system controller 40 reads searching data for audio data having the highest reproducing frequency and the start address from the disc 20 and stores them to the searching data storing portion 41 corresponding to the symbol.

At step S156, the system controller 40 stores the value of which 1 is subtracted from the number of songs stored in the disc 20 as the number of remaining songs to the storing portion 46.

At step S157, the system controller 40 updates the font point A of the symbol stored in the storing portion 46 to for example A−1.

At step S158, the display portion 10 displays a symbol with the font point information about the symbol supplied from the storing portion 46 (namely, font point A) and the symbol coordinate data (C, D) corresponding to the DR average value and the rhythm average value supplied from the searching data storing portion) under the control of the system controller 40. In this example, the DR average value is a DR average value of audio data having the highest reproducing frequency and audio data having the next highest reproducing frequency. Likewise, the rhythm average value is a rhythm average value of audio data having the highest reproducing frequency and audio data having the next highest reproducing frequency. The symbol coordinate data (C, D) is coordinates normalized by dividing the DR average value and the rhythm average value of audio data having the highest reproducing frequency and audio data having the next highest reproducing frequency by the DR average value and the rhythm average value of audio data having the highest reproducing frequency.

At step S159, the system controller 40 reads searching data for audio data having the next highest reproducing frequency and the start address from the disc 20 and stores them to the searching data storing portion 41 corresponding to the symbol.

At step S160, the system controller 40 subtracts 1 from the number of remaining songs stored in the storing portion 46. In other words, the system controller 40 subtracts 1 from the number of remaining songs stored in the storing portion 46 and stores the resultant value as the number of remaining songs to the storing portion 46.

At step S161, the system controller 40 determines whether or not the number of remaining songs is smaller than 0. When the number of remaining songs is 0 or larger, the flow returns to step S167. At step S167, the system controller 40 repeats the similar process. In other words, the system controller 40 performs the symbol displaying process corresponding to the similarity. In contrast, when the determined result represents that the number of remaining songs is smaller than 0, the flow advances to step S162.

At step S162, the system controller 40 determines whether or not the user has turned off the power corresponding to a signal supplied from the input portion 39. When the determined result represents that the user has not turned off the power, the flow returns to step S151. When the determined result represents that the user has turned off the power, the system controller 40 completes the process.

Figure 12:
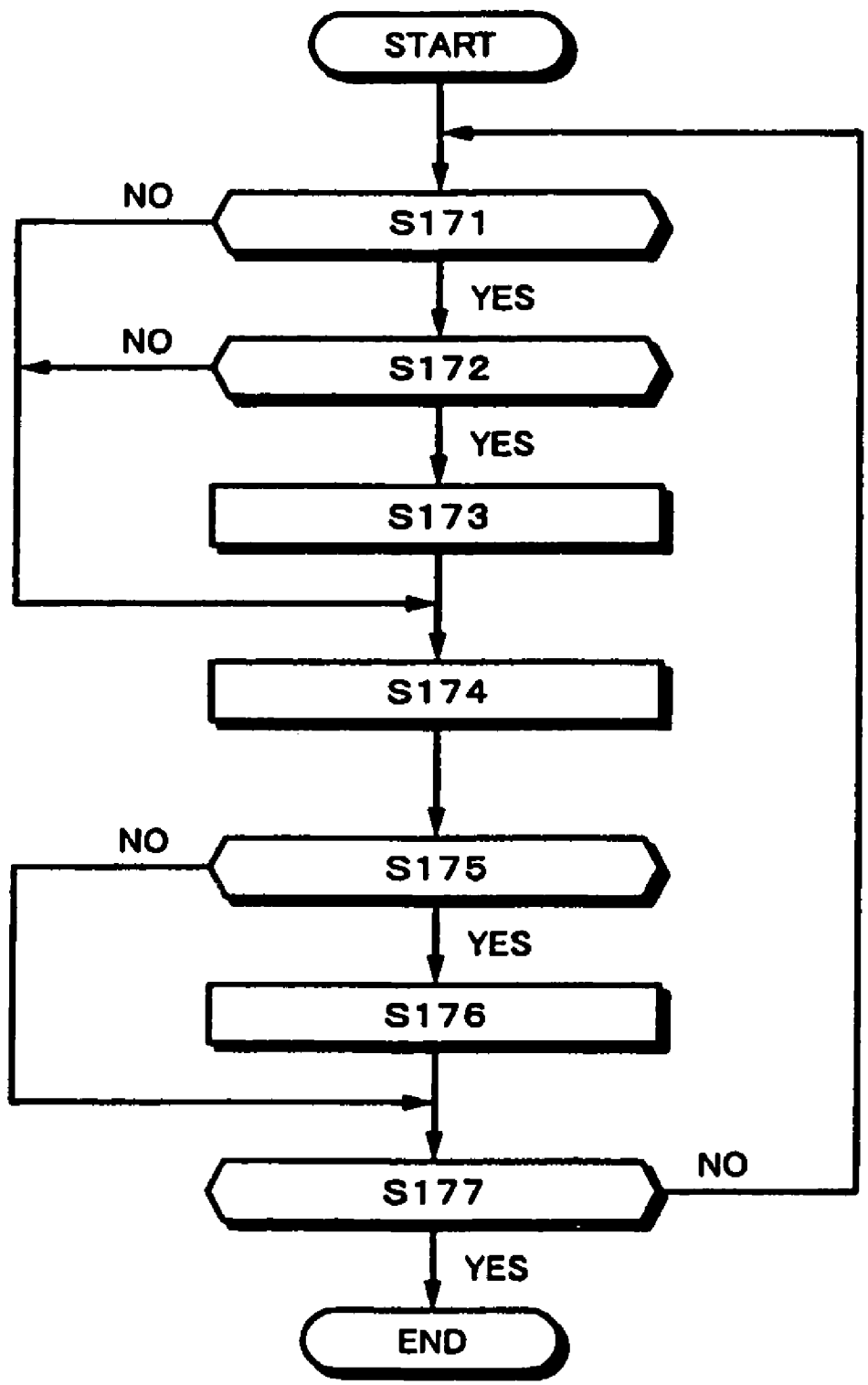
FIG. 12 is a flow chart for explaining processes for searching for a desired audio data and reproducing the obtained audio data in the recommend mode according to the second embodiment of the present invention.

FIG. 12 is a flow chart for explaining a process of the system controller 40 that searches for a desired audio data and reproduces the searched data in the recommend mode shown in FIGS. 8 and 10.

At step S171, the system controller 40 detects whether or not the user has moved a pointer corresponding to a signal supplied from the display portion 10. When the detected result represents that the user has moved the pointer, the flow advances to step S172. In contrast, when the detected result represents that the user has not moved the pointer, the flow advances to step S174.

At step S172, the system controller 40 determines whether or not there is a symbol for pointer coordinates corresponding to a signal supplied from the display portion 10. When the determined result represents that there is such a symbol, the flow advances to step S173. In contrast, when the determined result represents that there is no such a symbol, the flow advances to step S174.

At step S173, the system controller 40 reads additional information of audio data corresponding to the symbol from the searching data storing portion 41 or the disc 20.

At step S174, the system controller 40 displays the system corresponding to the additional information that has been read from the searching data storing portion 41 at step S173. In addition, the system controller 40 reads searching audio data corresponding to the symbol from the searching data storing portion 41 and reproduces searching audio data.

At step S175, the system controller 40 determines whether or not the user has pressed the touch panel of the display portion 10 corresponding to a signal supplied from the input portion 39. When the user has pressed the touch panel, the system controller 40 determines that the user has designated the reproducing operation. At that point, the flow advances to step S176. In contrast, when the user has not pressed the touch panel, the system controllers determines that the user has not designated the reproducing operation. At that point, the flow advances to step S177.

At step S176, the system controller 40 reads the start address of audio data corresponding to the symbol designated by the pointer from for example the searching data storing portion 41, controls the optical head 22 corresponding to the start address, reads audio data from the disc 20, and reproduces audio data.

At step S177, the system controller 40 determines whether or not the user has turned off the power corresponding to a signal supplied from the input portion 39. When the determined result represents that the user has not turned off the power, the flow returns to step S171. When the determined result represents that the user has turned off the power, the system controller 40 completes the process.

In the recording and reproducing apparatus according to the second embodiment of the present invention, when the user moves the pointer on a symbol, he or she can listen to a beginning portion or a bridge portion of audio data corresponding to a symbol. While listening to the beginning portion or the bridge portion, the user searches for his or her desired audio data and designates the reproducing operation for the desired data. Thus, since the system controller 40 reads audio data from the disc 20 and starts reproducing it, the user can easily search for his or her desired audio data.

A symbol that represents audio data having a higher reproducing frequency or a similar data occupies a wide area on the display portion 10. Thus, the user can easily select a symbol of audio data. In other words, the user can easily designates the reproducing operation for a song having a higher reproducing frequency (in other words, a song to which he or she often listens).

In addition, since symbols of songs similar to a song that has the highest reproducing frequency are displayed in such a manner that the user can easily select them on the display screen, he or she can easily select his or her favorite song.

In addition, whenever the user reproduces audio data, a system corresponding to data is changed. Thus, audio data can be automatically customized to a recording and reproducing apparatus that is the most suitable for the user.

Next, a modification of the second embodiment will be described. According to the second embodiment of the present invention, notes corresponding to audio data stored in the disc 20 are displayed as symbols. In contrast, according to the modification of the second embodiment of the present invention, thumb nails of jacket images corresponding to audio data stored in the disc 20 are displayed as symbols. The appearance and structure of the recording and reproducing apparatus according to the modification of the second embodiment of the present invention are the same as those of the recording and reproducing apparatus according to the first embodiment, their description will be omitted. In addition, according to the modification of the second embodiment of the present invention, as searching data, as well as data according to the first embodiment of the present invention, image information of thumb nails of jacket images and so forth are recorded in the searching data storing portion 41. On the other hand, information about font points of symbols displayed on the display portion 10, information about display positions of symbols, information about the number of songs, and so forth are stored in the storing portion 46.

Since the process for calculating the similarity of audio data that has the highest reproducing frequency and another audio data according to the modification of the second embodiment is the same as that according to the second embodiment of the present invention, the description thereof will be omitted.

Figure 13:
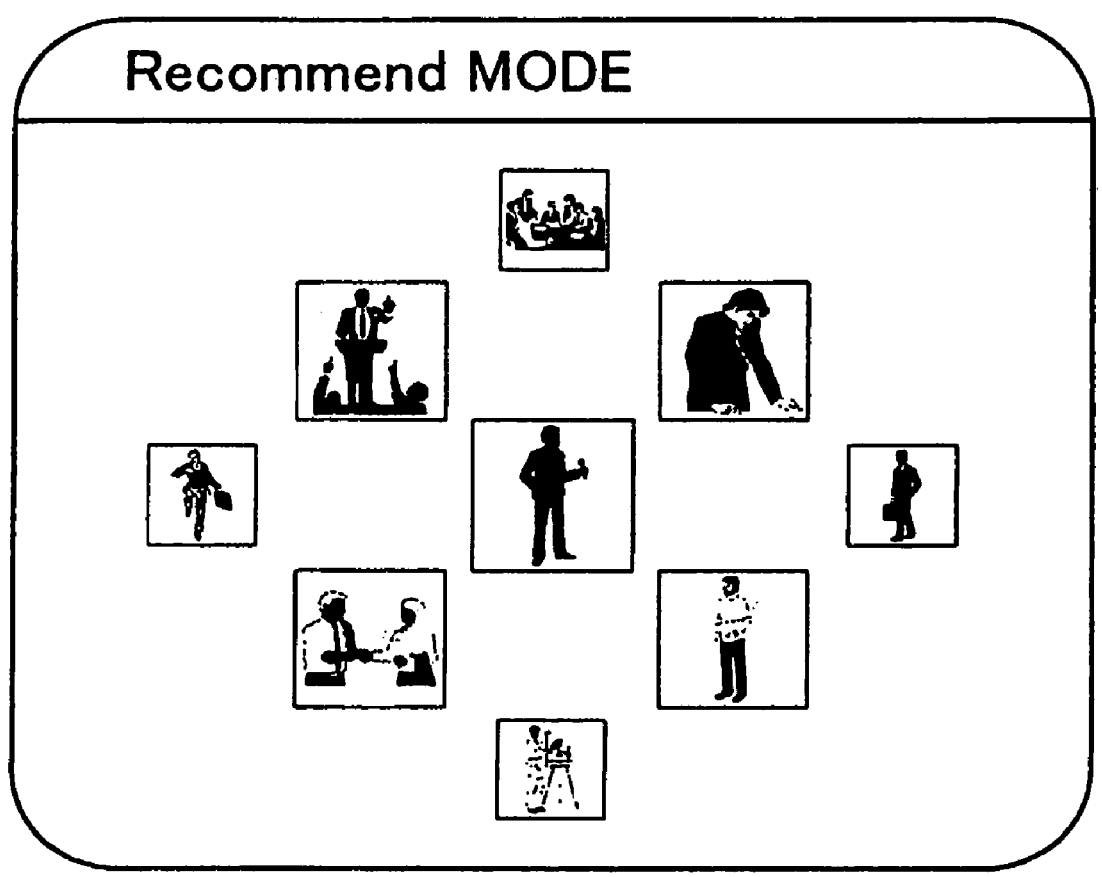
FIG. 13 is a schematic diagram showing an example of a display screen in the recommend mode according to a modification of the second embodiment of the present invention.

FIG. 13 shows an example of the display screen in the recommend mode of which the user can know similarities of songs with thumb nails as jacket images. The thumb nails as jacket images displayed on the display portion 10 correspond to audio data stored in the disc 20. The size of each thumb nail depends on the similarity of the corresponding to audio data and audio data that has the highest reproducing frequency. For example, as the similarity of audio data and audio data having the highest reproducing frequency is lower, the size of the corresponding thumb nail becomes smaller. Alternatively, as the similarity of audio data and audio data having the highest reproducing frequency is lower, the size of the corresponding thumb nail becomes larger. FIG. 13 shows an example of which as the similarity of audio data and audio data having the highest reproducing frequency is lower, the size of the corresponding thumb nail becomes smaller.

Alternatively, the picture quality of each thumb nail may depend on the reproducing frequency of the corresponding data. For example, as the similarity of audio data and audio data having the highest reproducing frequency is lower, the image quality of the thumb nail of the corresponding data becomes lower. Alternatively, as the similarity of audio data and audio data that has the highest reproducing frequency is lower, the image quality of a thumb nail of the corresponding data becomes higher. In this case, a lower image quality of a thumb nail results in lower sharpness and a lower resolution (mosaic image). In contrast, a higher image quality results in a sharper image and a higher resolution. When thumb nails are displayed in such a manner, the user can intuitively search audio data corresponding to reproducing similarities thereof.

Alternatively, the size and image quality of each thumb nail may depend on the reproducing frequency of a corresponding audio data. For example, as the similarity of audio data and audio data having the highest reproducing frequency is lower, the size of a thumb nail corresponding to data becomes smaller and the image quality of the thumb nail becomes lower. Alternatively, as the similarity of audio data and audio data that has the highest reproducing frequency is lower, the size of a thumb nail corresponding to data becomes larger and the image quality of the thumb nail becomes higher. When thumb nails are displayed in such a manner, the user can intuitively search audio data corresponding to the reproducing frequencies thereof.

Since the symbol displaying process on the display screen in the recommend mode shown in FIG. 13 and the process for searching for a desired audio data and reproducing it according to the modification are almost the same as those according to the second embodiment, their description thereof will be omitted.

Next, a recording and reproducing apparatus according to a third embodiment of the present invention will be described. According to the second embodiment, for example, symbols corresponding to audio data are displayed on the display portion 10. In contrast, according to the third embodiment of the present invention, symbols corresponding to audio data stored in each data area on the disc 20 are displayed on the display portion 10. Since the appearance and structure of the recording and reproducing apparatus according to the third embodiment of the present invention are the same as those of the recording and reproducing apparatus according to the first embodiment of the present invention, their description will be omitted.

In addition, according to the third embodiment of the present invention, the storing portion 46 has stored information about GUI (Graphical User Interface) searching screens in individual searching modes (that will be described later), a searching program, and so forth. The searching data storing portion 41 has stored information about searching modes of searching screens displayed on the display portion 10 and information about indication of data areas. The searching screens are switched in the individual searched modes by executing the searching program stored in the storing portion 46 under the control of the system controller 40.

Figure 14:
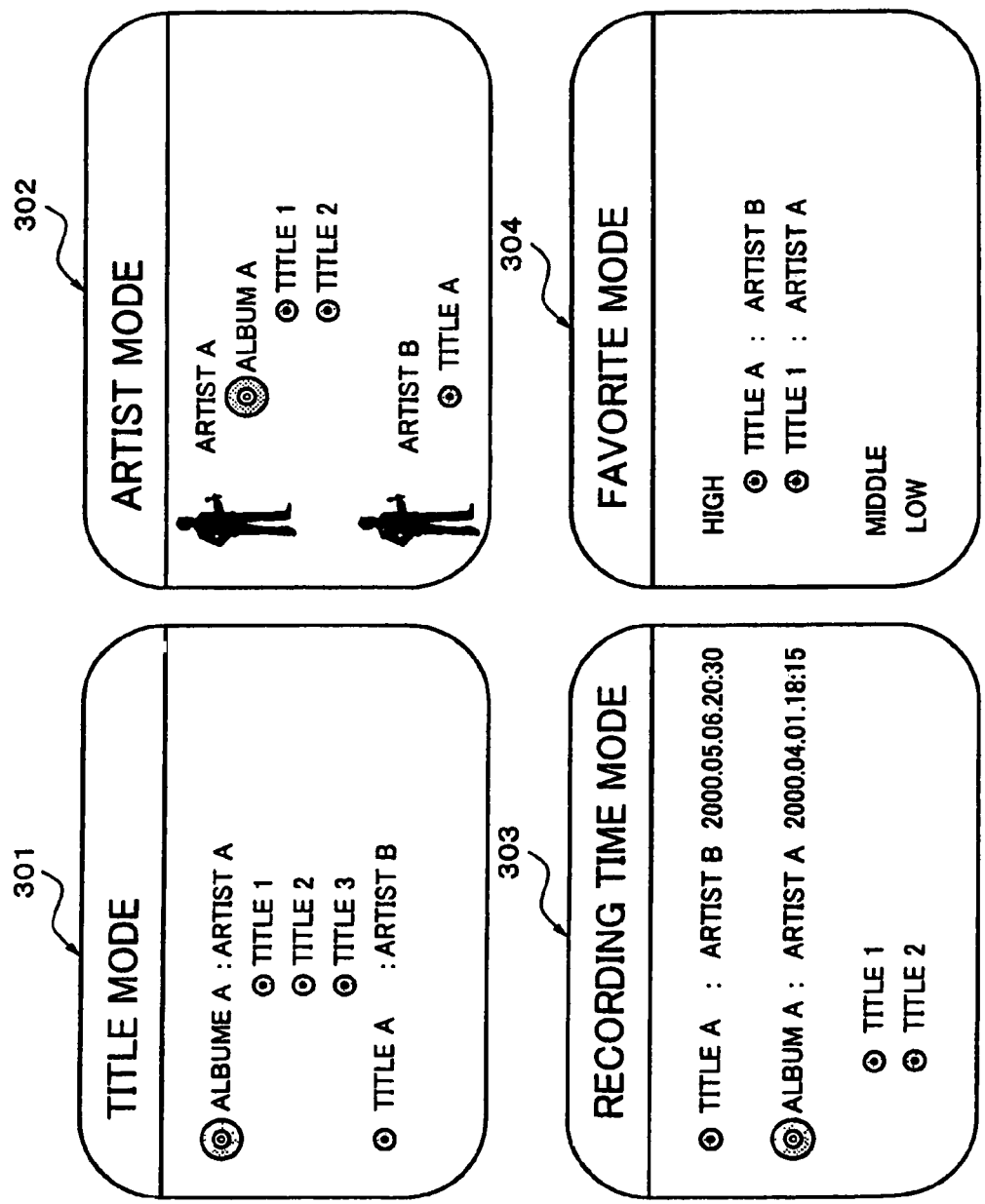
FIG. 14 is a schematic diagram showing an example of a searching screen in each searching mode according to a third embodiment of the present invention.
Figure 15:
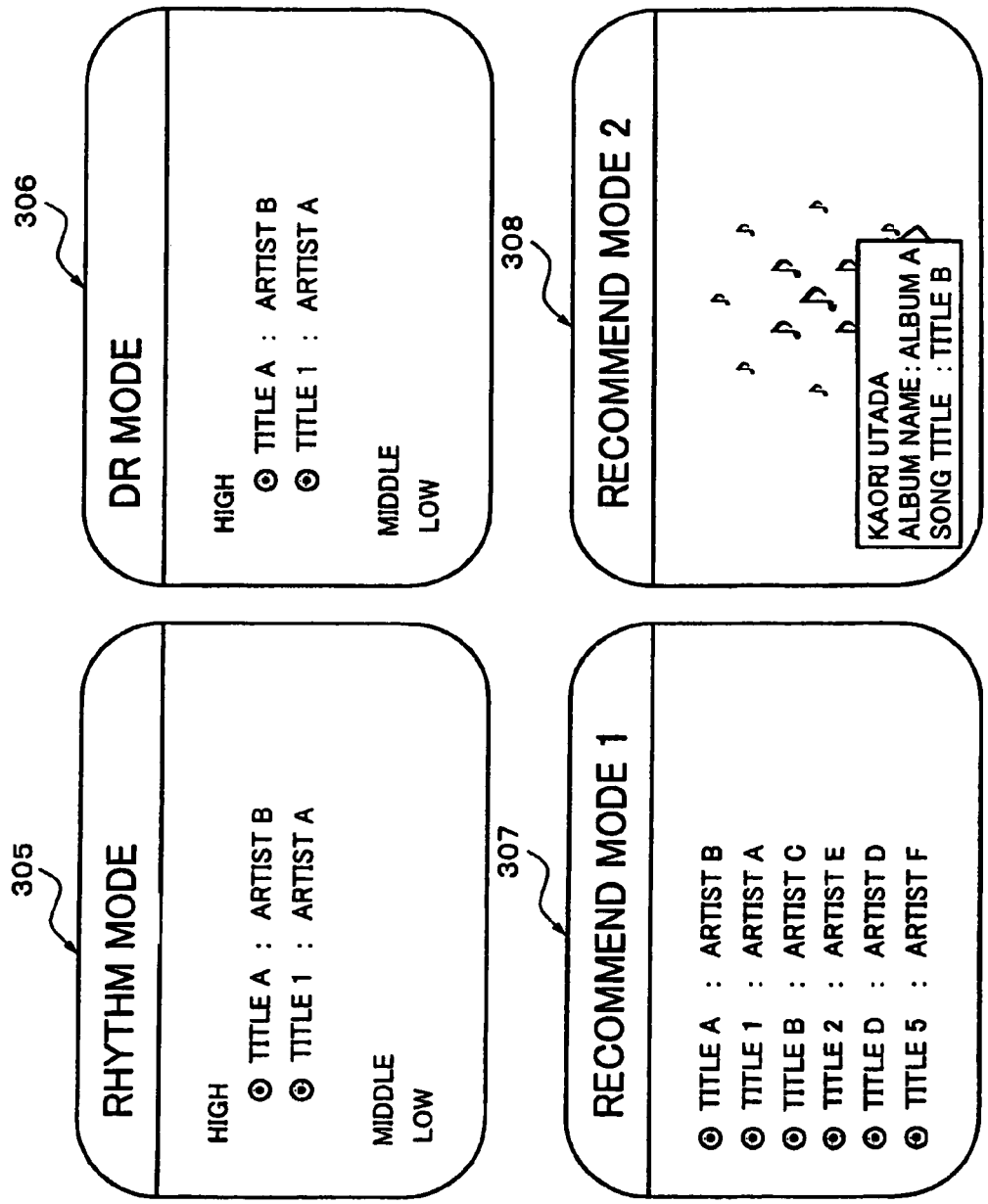
FIG. 15 is a schematic diagram showing an example of a searching screen in each searching mode according to the third embodiment of the present invention.

FIGS. 14 and 15 show examples of searching screens displayed in individual searching modes. A searching screen 301 is an example of a searching screen in mode 1 (title mode). In the title mode, information about audio data stored in the disc 20 is displayed for each album or each title as a directory. In this example, since a symbol of an album is different from a symbol of a song, the user can distinguish the former from the latter. In addition, each symbol may represent information about a compression system and a modulation system of audio data. For example, each symbol may represent information such as MP3, ATRAC, AAC, and PCM.

A searching screen 302 is an example of a searching screen in mode 2 (artist mode). In the searching screen 302, audio data stored in the disc 20 are displayed for each artist.

A searching screen 303 is an example of a searching screen in mode 3 (recording time mode). In the recording time mode, titles of audio data stored in the disc 20 are sorted and displayed in the order of newer titles.

A searching screen 304 is an example of a searching screen in mode 4 (favorite mode). In the favorite mode, titles of audio data are categorized as several directories corresponding to reproducing frequencies and titles are displayed in the categorized order. For example, on the searching screen 304, titles of audio data stored in the disc 20 are categorized as high, middle, and low in the order of reproducing frequencies and titles are displayed in the categorized order.

A searching screen 305 is an example of a searching screen in mode 5 (rhythm mode). In the rhythm mode, titles of audio data stored in the disc 20 are categorized corresponding to average values of peak intervals of a predetermined band and the titles are displayed in the categorized order. For example, on the searching screen 305, titles of audio data are categorized as directories high, middle, and low in the order of higher rhythm average values and titles are displayed in the categorized order.

A searching screen 306 is an example of a searching screen in mode 6 (DR mode). In the DR mode, titles of audio data stored in the disc 20 are categorized corresponding to DR average values of predetermined intervals of audio data and titles are displayed in the categorized order. For example, on the searching screen 306, titles of audio data stored in the disc are categorized as three categories high, middle, and low in the order of higher DR average values and titles are displayed in the three categorized order.

A searching screen 307 is an example of a searching screen in mode 7 (recommend mode 1). In the recommend mode 1, titles of audio data stored in the disc 20 are displayed in the order of similarities with a title of audio data having the highest reproducing frequency.

A searching screen 308 is an example of a searching screen in mode 8 (recommend mode 2). In the recommend mode 2, symbols of audio data are displayed in the order of similarities with audio data having the highest reproducing frequency.

For example, on the searching screen 308, symbols of data are displayed with three sizes corresponding to similarities with audio data having the highest reproducing frequency.

Figure 16:
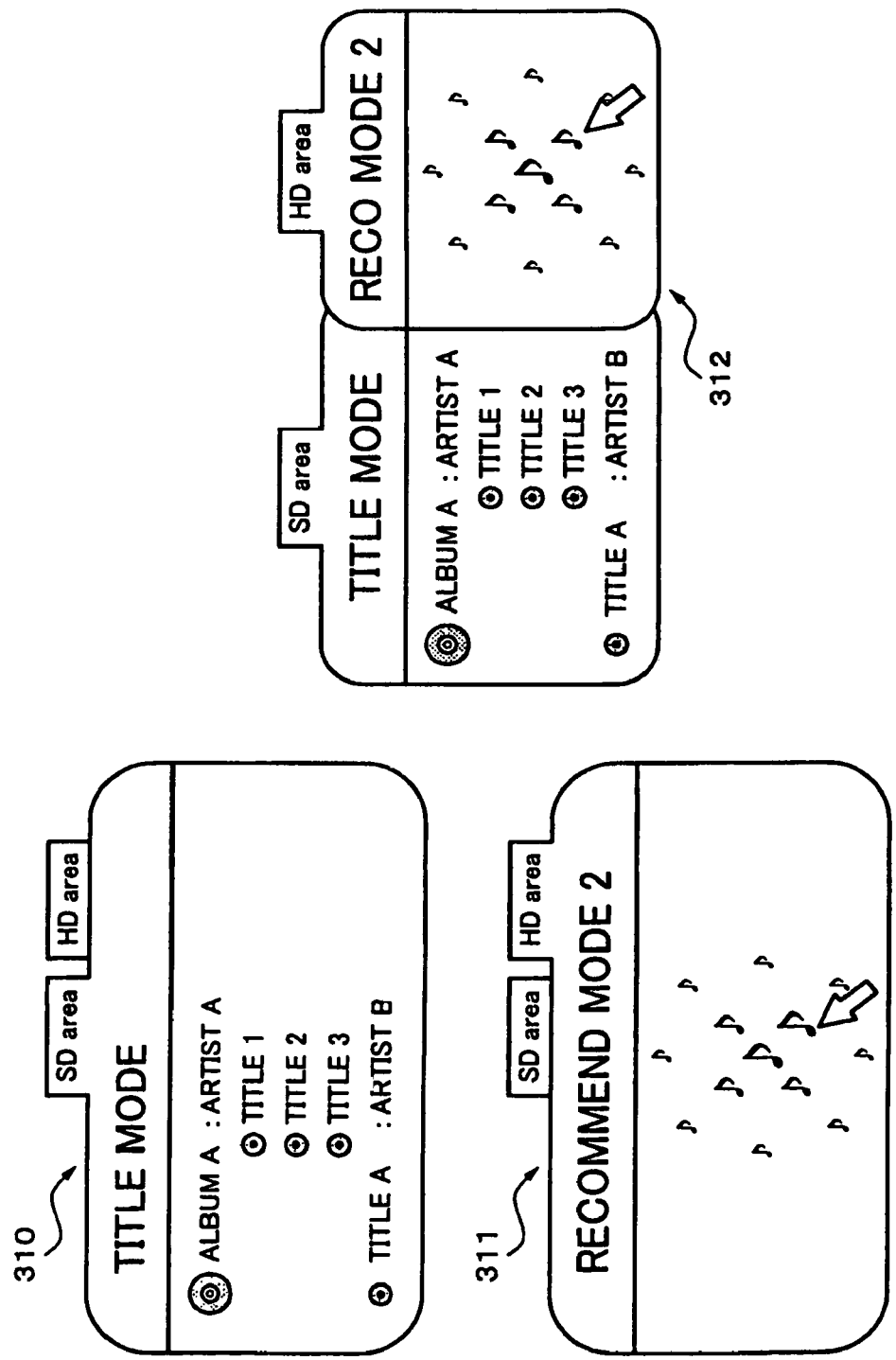
FIG. 16 is a schematic diagram showing an example of a screen that displays audio data in each data area according to the third embodiment of the present invention.

FIG. 16 shots examples of screens that display audio data stored in the disc 20 in individual data areas. A screen 310 and a screen 311 are switchably displayed as a full screen. In this example, the screen 310 displays titles of audio data stored in a single density area. The screen 311 displays titles of audio data stored in a double density area. The screen switching operation between the screen 310 and the screen 311 will be described later.

A screen 312 is an example of a screen that displays both the screen 310 and the screen 311 at a time, not switched. On the screen 312, the user can browse both the screen 310 and the screen 311 at a time. The screen switching operation among the screen 310, the screen 311, and the screen 312 will be described later.

Figure 17:
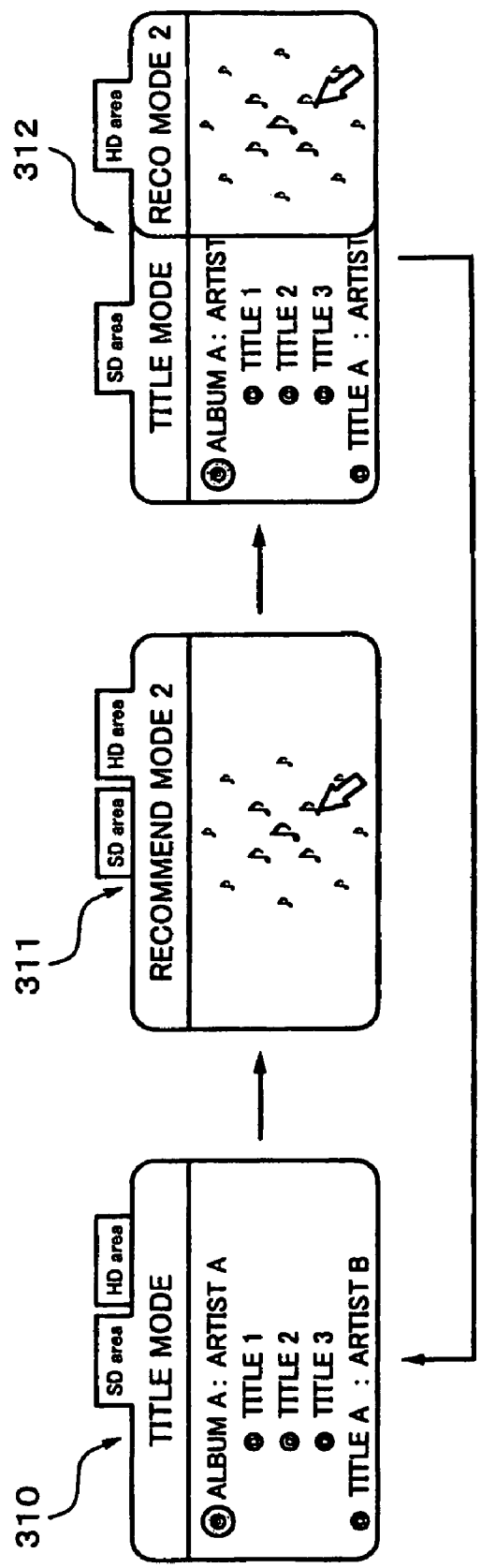
FIG. 17 is a schematic diagram for explaining a switching operation for data areas by a three-dimensional jog according to the third embodiment of the present invention.

FIG. 17 is a schematic diagram for explaining the switching operation for screens that display respective data areas with a three-dimensional jog. As shown in FIG. 4A, a three-dimensional jog stick 51 is operated. When a tack switch 55 is turned on, one data area screen is switched to another data area screen. Whenever the three-dimensional jog stick 51 is operated and the tact switch 55 is turned on, as shown in FIG. 17, one screen is switched to another screen in the order of the screen 310, the screen 311, and the screen 312.

Figure 18:
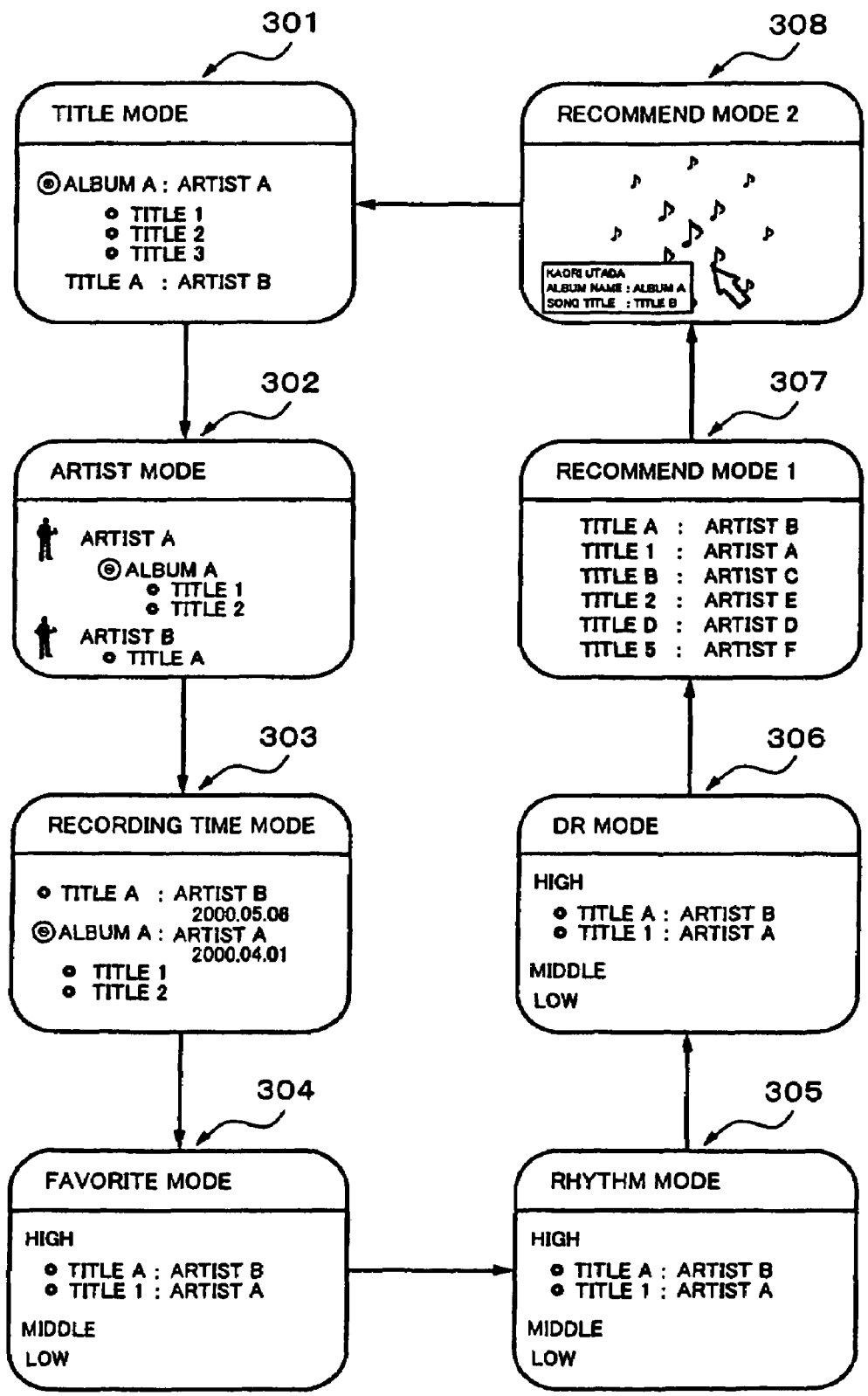
FIG. 18 is a schematic diagram for explaining a switching operation for searching mode display screens by the three-dimensional jog according to the third embodiment of the present invention.

FIG. 18 is a schematic diagram for explaining the screen switching operation for the searching mode screens with the three-dimensional jog. As shown in FIG. 4B, when the three-dimensional jog stick 51 is operated and the tact switch 53 is turned on, one searching mode screen is switched to another searching mode screen. Whenever the three-dimensional jog stick 51 is operated and the tact switch 53 is turned on, as shown in FIG. 18, one searching mode screen is switched to another searching mode screen in the order of the title mode 301, the artist mode 302, the recording time mode 303, the favorite mode 304, the rhythm mode 305, the DR mode 306, the recommend mode 1 (307), and the recommend mode 2 (308).

Figure 19:
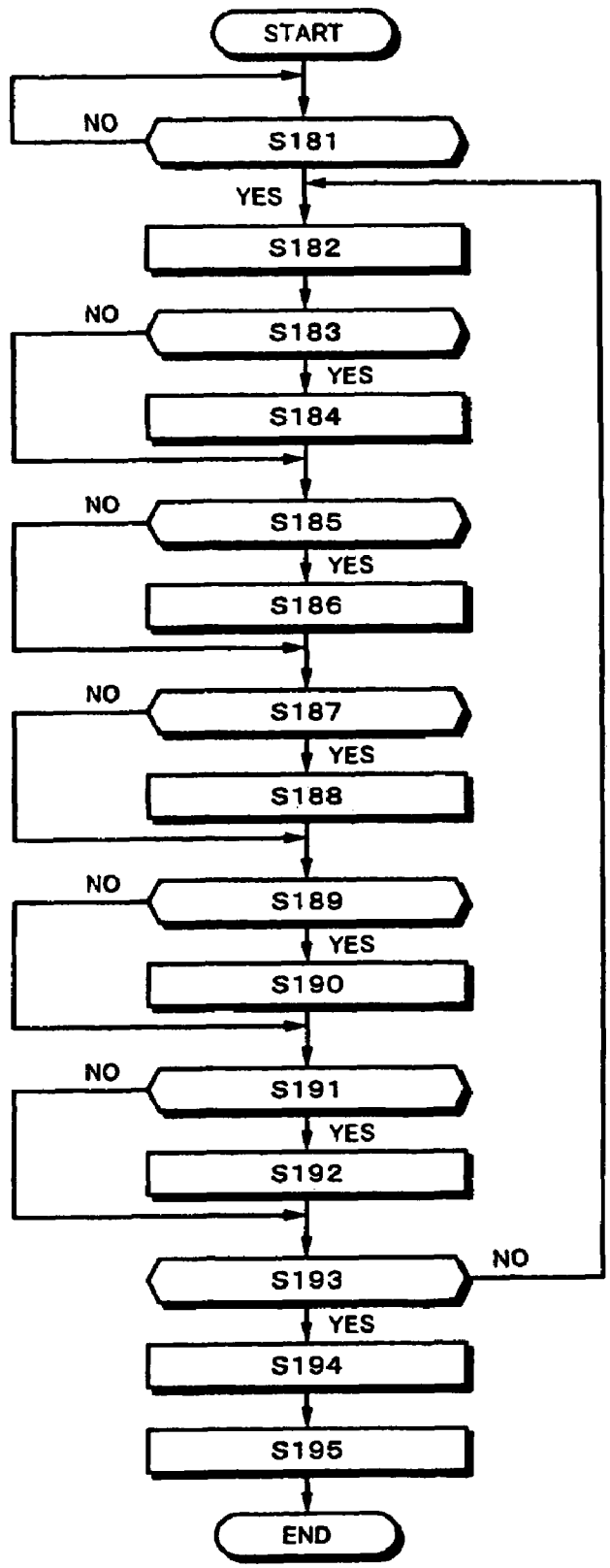
FIG. 19 is a flow chart for explaining a search for a desired audio data by the three-dimensional jog according to the third embodiment of the present invention.

FIG. 19 is a flow chart for explaining an operation and a process for switching one mode to another mode using the three-dimensional jog.

At step S181, the system controller 40 monitors a signal supplied from the input portion 39 in a low power mode. At that point, the system controller 40 determines whether or not the user has turned on the power switch. When the determined result represents that the user has turned on the power, the flow advances to step S182.

At step S182, the system controller 40 causes the display portion 10 to display information about audio data stored on the disc 20 corresponding to data about a searching mode and a data area indication stored in the searching data storing portion 41.

At step S183, the system controller 40 determines whether or not the three-dimensional jog stick 51 has been operated as shown in FIG. 4A and the tact switch 55 has been turned on corresponding to a signal supplied from the input portion 39. When the determined result represents that the tact switch 55 has been turned on, the flow advances to step S184. In contrast, when the determined result represents that the tact switch 55 has not been turned on, the flow advances to step S185.

At step S184, the system controller 40 switches the current data area indication to the next data area indication corresponding to data about data area indications stored in the storing portion 46.

At step S185, the system controller 40 determines whether or not the three-dimensional jog stick 51 has been operated as shown in FIG. 4B and the tact switch 53 has been turned on corresponding to a signal supplied from the input portion 39. When the determined result represents that the tact switch 53 has been turned on, the flow advances to step S186. When the determined result represents that the tact switch 53 has not been turned on, the flow advances to step S187.

At step S186, the system controller 40 switches the current searching mode to the next searching mode corresponding to data about searching modes stored in the storing portion 46.

At step S187, the system controller 40 determines whether or not the three-dimensional jog stick 51 has been rotated in the forward direction as shown in FIG. 4C corresponding to a signal supplied from the input portion 39. When the determined result represents that the three-dimensional jog stick 51 has been rotated in the forward direction, the flow advances to step S188. When the determined result represents that the three-dimensional jog stick 51 has not been rotated in the forward direction, the flow advances to step S189.

At step S188, the system controller 40 controls an audio data selection cursor displayed on the display portion 10 so that the audio data selection cursor moves to for example the next title.

At step S189, the system controller 40 determines whether or not the three-dimensional jog stick 51 has been rotated in the backward direction as shown in FIG. 4D corresponding to a signal supplied from the input portion 39. When the determined result represents that the three-dimensional jog stick 51 has been rotated in the backward direction, the flow advances to step S190. When the determined result represents that the three-dimensional jog stick 51 has not been rotated in the backward direction, the flow advances to step S191.

At step S190, the system controller 40 controls the display portion 10 so that the cursor displayed on the display portion 10 moves to the previous position.

At step S191, the system controller 40 determines whether or not the user has pressed the three-dimensional jog stick 51 as shown in FIG. 4E corresponding to a signal supplied from the input portion 39. When the determined result represents that the user has pressed the three-dimensional jog stick 51, the flow advances to step S192. When the determined result represents that the user has not pressed the three-dimensional jog stick 51, the flow advances to step S193.

At step S192, the system controller 40 reproduces audio data that has been selected at that point with the selecting cursor.

At step S193, the system controller 40 determines whether or not the user has turned off the power switch corresponding to a signal supplied for the input portion 39. When the determined result represents that the user has turned off the power switch, the flow advances to step S194. When the determined result represents that the user has not turned off the power switch, the flow returns to step S182.

At step S194, the system controller 40 stores information about the current searching mode and data area indication to the searching data storing portion 41.

At step S195, the power is turned off. Thereafter, the process is completed.

As was described above, the recording and reproducing apparatus according to the third embodiment of the present invention can switch one screen to another screen for each data area of the disc 20, it is not necessary to display a data area that the user does not need on the disc 20 (for example, a data area that stores for example commercial data). As a result, the user can easily search for his or her desired title. In addition, since the user can select his or her desired mode from a plurality of searching modes, he or she can search for his or her desired title corresponding to his or her searching purpose. In addition, since the user can designate a searching mode for each data area, he or she can select a searching mode corresponding to the quality of stored data. Thus, the user can easily search for his or her desired title.

Although embodiments of the present invention have been described in detail, it should be noted that the present invention is not limited to the foregoing embodiments. Instead, various modifications of the foregoing embodiments are available without departing from the spirit of the present invention.

In the forgoing embodiments, the present invention is applied to a recording and reproducing apparatus that searches for a desired audio data and reproduces the obtained audio data as the searched result. Alternatively, the present invention can be applied to a recording and reproducing apparatus that searches for a desired video data and reproduces the obtained video data as the searched result. In this case, audio quality, audio volume, and time period of audio data are controlled. In addition, video size, resolution, and time period of video data are controlled.

In the forgoing embodiments, audio data stored in the disc 20 having a single density area and a double density area are searched for a desired data and the searched data is reproduced. Alternatively, audio data stored in a disc having three or more data areas can be searched for a desired data and the searched data can be reproduced.

In addition, according to the forgoing embodiments, searching data are stored to both the disc 20 and the recording and reproducing apparatus. Alternatively, searching data may be stored to at least one of the disc 20 and the recording and reproducing apparatus.

In addition according to the first embodiment of the present invention, searching audio data is reproduced corresponding to audio volume data, audio quality data, and time period data. Alternatively, searching audio data may be reproduced corresponding to at least one of audio volume data, audio quality data, and time period data. Alternatively, searching audio data may be reproduced corresponding to other than the forgoing audio volume data, audio quality data, and time period data.

According to the second embodiment and the modification thereof, the operation and process in the case that the display portion 10 is a touch panel were described. However, the present invention is not limited to such a case. For example, a pointer displayed on the display portion 10 may be moved with for example a mouse connected to the recording and reproducing apparatus so as to reproduce a designated content. Alternatively, a pointer may be moved by an operation of the input portion 39 so as to reproduce a designated content.

In addition, according to the second embodiment and the modification thereof, the sizes of symbols are varied in a constant ratio corresponding to the similarities with audio data having the highest reproducing frequency. Alternatively, the sizes of symbols may be varied corresponding to the similarities with audio data having the highest reproducing frequency.

In addition, according to the second embodiment and the modification thereof, the evaluation value is calculated corresponding to only the difference of audio data and audio data having the highest reproducing frequency. Alternatively, the evaluation value of each audio data may be calculated by adding weighted similarities thereof.

In addition, according to the second embodiment and the modification thereof, the sizes of symbols depend on the similarities thereof. Alternatively, the sizes of symbols may depend on the reproducing frequencies thereof. For example, as the reproducing frequency of data is lower, the size of the corresponding symbol displayed may become smaller or larger.

In addition, according to the second embodiment and the modification thereof, the font points of symbols are varied and the resultant symbols are displayed corresponding to the similarities of corresponding data. Alternatively, the colors or shapes of symbols may be varied corresponding to the similarities of the corresponding contents.

In addition, according to the second embodiment and the modification thereof, the similarities of audio data that has the highest reproducing frequency and other audio data are calculated. The symbols of audio data are displayed corresponding to the similarities of data. Alternatively, the similarities of a particular audio data that the user has designated and other audio data may be calculated. The symbols may be displayed corresponding to the similarities of data.

In addition, according to the second embodiment and the modification thereof, as the similarity of audio data and audio data having the highest reproducing frequency is lower, the size of the corresponding symbol becomes larger. Alternatively, as the similarity of audio data and audio data that has the highest reproducing frequency is lower, the size of the corresponding symbol may become larger.

In addition, according to the modification of the second embodiment, the size of a thumbnail is varied corresponding to the similarity of audio data and audio data having the highest reproducing frequency. Alternatively, the image quality of a thumbnail may be varied corresponding to the similarity of audio data and audio data having the highest reproducing frequency. For example, as the similarity of audio data and audio data having the highest reproducing frequency is lower, the image quality of the corresponding thumbnail becomes more deteriorated and thereby more dimmed. Alternatively, as the similarity of audio data and audio data having the highest reproducing frequency becomes lower, the image quality of the corresponding thumbnail may be more improved and thereby more clearly displayed. Alternatively, the image quality of a thumbnail may be varied corresponding to the reproducing frequency of audio data rather than the similarity of audio data and audio data having the highest reproducing frequency. For example, as the reproducing frequency of audio data is lower, the image quality of the corresponding thumbnail may be more deteriorated and thereby more dimmed. Alternatively, as the reproducing frequency of audio data is lower, the image quality of the corresponding thumbnail may be more improved and thereby more clearly displayed.

In addition, since the recording and reproducing apparatuses according to the first embodiment, the second embodiment, the modification of the second embodiment, and the third embodiment can be accomplished with the same structure, a combination of a plurality of searching methods according to the forgoing embodiments can be used with one recording and reproducing apparatus so as to search for a desired data. For example, the searching method according to the first embodiment and the searching method according to the second embodiment may be combined. In other words, when a symbol corresponding to audio data stored in the disc 20 is designated by a pointer, audio data may be reproduced with audio volume, audio quality, and time corresponding to the reproducing frequency.

In addition, searching audio data stored in the searching data storing portion 41 may be processed as follows. In other words, the start portion and the last portion of searching audio data are formed as a fade-in area and a fade-out area, respectively.

In addition, searching audio data may be processed using other than the encoding system for main audio data. Since the audio quality of searching audio data is not so important, data may be compressed using a compression system that has a higher compression ratio than that used in main audio data. For example, searching audio data may be processed using an encoding method having a high compression ratio such as MP3 (MPEG1 Audio Layer III), ADPCM (Adaptive Differential Pulse Code Modulation). As a result, the data amount stored in the searching data storing portion 41 can be decreased. In other words, the hardware scale of the searching data recording portion 41 can be reduced. In addition, the cost of the searching data storing portion 41 can be decreased.

Since the decoding time of searching audio data should be short, searching audio data may be encoded using an encoding method whose encoding time is shorter than the encoding method used for main audio data. For example, searching audio data may be processed using an encoding method having a high compression ratio such as MP3 (MPEG1 Audio Layer III) or ADPCM (Adaptive Differential Pulse Code Modulation). Thus, the decoding time necessary for decoding a searching audio data can be decreased.

In addition, searching audio data may be generated using another audio source. In this case, main audio data is recorded on 5.1 channels. On the other hand, searching audio data is recorded in stereo on 2 channels.

As was described above, according to the present invention, searching audio data that is reproduced as the searched result of a user's desired audio data varies in audio volume, audio quality, and time period depending on the reproducing frequency of audio data. Thus, the user can intuitively search for his or her desired audio data.

In addition, since searching data is stored in both a disc that stores main audio data and a searching data storing portion of the recording and reproducing apparatus, even if searching data stored in the searching data storing portion of the recording and reproducing apparatus is changed or when the recording and reproducing apparatus is changed to another apparatus and audio data stored in the disc is reproduced by the other recording and reproducing apparatus, using the same searching data stored in the disc, the user can search for his or her desired audio data in his or her suitable searching method.

In addition, when the user moves a pointer on a symbol, he or she can listen to a beginning portion or a bridge portion of audio data corresponding to the symbol. While listening to that, the user can search for his or her desired audio data. When the user designates the reproduction for the desired audio data, the desired audio data is read from the disc and audio data is reproduced. Thus, the user can easily search for his or her desired audio data and reproduce the obtained audio data as the searched result.

In addition, since a symbol that represents audio data having a high reproducing frequency or audio data similar thereto occupies a large area on the display portion, the user can easily designate the reproduction of a song having a high reproducing frequency (namely, a song to which he or she often listens).

In addition, since a symbol of a song that is similar to a song having a high reproducing frequency is displayed in such a manner that they can be easily selected, the user can easily select his or her favorite songs.

In addition, whenever the user reproduces audio data, the corresponding symbol is varied. Thus, the symbol of audio data can be automatically customized to a recording and reproducing apparatus that is suitable for the user.

In addition, symbols that are displayed vary corresponding to the similarities. Thus, since the user can visually know similarities of songs, he or she can intuitively search for his or her desired song. As a result, the user can easily search for his or her desired song in a short time.

In addition, since a screen can be switched for each data area of a storage medium, it is not necessary to display a data area that the user does not desire (for example, CM data). Thus, the user can easily search for his or her desired title.

In addition, since the user can select one mode from a plurality of searching modes, he or she can search for his or her desired data corresponding to his or her searching purpose.

In addition, since the user can designate a searching mode screen for each data area, he or she can designate a searching mode corresponding to the quality of data stored in the disc. Thus, the user can easily search for his or her desired title.

DESCRIPTION OF REFERENCE NUMERALS

1 FRONT PANEL
2 THREE-DIMENSIONAL JOG
3 STOP BUTTON
4 REWIND BUTTON
5 RECORD BUTTON
6 REPRODUCTION BUTTON
7 FAST FORWARD BUTTON
8 PAUSE BUTTON
9 VOLUME
10 DISPLAY PORTION
S101 HAS REPRODUCING COMMAND BEEN ISSUED?
S102 INCREMENT NUMBER-OF-REPRODUCING-TIMES DATA OF CONTENT OF SEARCHING AUDIO DATA BY 1
S103 UPDATE AUDIO VOLUME DATA
S104 UPDATE AUDIO QUALITY DATA
S105 UPDATE TIME PERIOD DATA
S106 UPDATE CONTENTS OF SEARCHING AUDIO DATA
S107 HAS POWER BEEN TURNED OFF?
S111 REPRODUCE CONTENT OF SEARCHING AUDIO DATA
S112 HAS SELECTED CONTENT CHANGING COMMAND BEEN ISSUED?
S113 CHANGE SELECTED CONTENT
S114 HAS REPRODUCING COMMAND BEEN ISSUED?
S115 START REPRODUCING SELECTED CONTENT
S116 HAS POWER BEEN TURNED OFF?
S121 HAS REPRODUCING COMMAND BEEN ISSUED?
S122 UPDATE NUMBER-OF-REPRODUCTION-TIMES OF CONTENT OF SEARCHING DATA TO NUMBER OF REPRODUCTION TIMES+1
S123 DECIDE CONTENT OF AUDIO DATA HAVING HIGHEST REPRODUCING FREQUENCY
S124 CALCULATE DR AVERAGE VALUE IN EACH PREDETERMINED TIME PERIOD
S125 CALCULATE AVERAGE OF PEAK INTERVALS OF PREDETERMINED BAND
S126 CALCULATE SIMILARITIES OF SONG HAVING HIGHEST REPRODUCING FREQUENCY AND OTHER SONGS AND STORE CALCULATED SIMILARITIES
S127 HAS POWER BEEN TURNED OFF?
S131 HAS RECOMMEND BEEN DESIGNATED?
S132 SET FONT POINT TO A
S133 SET COORDINATE DATA TO (C, D)
S134 DISPLAY SYMBOL WITH A, (C, D)

S135 STORE CONTENT OF SEARCHING DATA FOR CONTENT OF AUDIO DATA HAVING HIGHEST REPRODUCING FREQUENCY AND START ADDRESS OF DISC
S136 SUBTRACT 1 FROM NUMBER OF SONGS→NUMBER OF REMAINING SONGS
S137 A=A−1, UPDATE COORDINATE DATA (C, D)
S138 DISPLAY SYMBOL WITH A AND (C, D)
S139 STORE CONTENT OF SEARCHING DATA FOR NEXT CONTENT OF AUDIO DATA AND START ADDRESS OF DISC
S140 NUMBER OF REMAINING SONGS=NUMBER OF REMAINING SONGS−1
S141 NUMBER OF REMAINING SONGS<0?
S142 HAS POWER BEEN TURNED OFF?
S151 HAS RECOMMEND BEEN DESIGNATED?
S152 SET FONT POINT TO A
S153 SET COORDINATE DATA TO (C, D)
S154 DISPLAY SYMBOL WITH A AND (C, D)
S155 STORE CONTENT OF SEARCHING DATA FOR CONTENT OF AUDIO DATA HAVING HIGHEST REPRODUCING FREQUENCY AND START ADDRESS OF DISC
S156 SUBTRACT 1 FROM NUMBER OF SONGS→NUMBER OF REMAINING SONGS
S157 A=A−1
S158 DISPLAY SYMBOL WITH A AND (AMPLITUDE, RHYTHM)
S159 STORE CONTENT OF SEARCHING DATA FOR NEXT CONTENT OF AUDIO DATA AND START ADDRESS OF DISC
S160 NUMBER OF REMAINING SONGS=NUMBER OF REMAINING SONGS−1
S161 NUMBER OF REMAINING SONGS<0?
S162 HAS POWER BEEN TURNED OFF?
S171 HAVE POINTER BEEN MOVED?
S172 IS THERE SYMBOL CORRESPONDING TO POINTER COORDINATES?
S173 READ ADDITIONAL INFORMATION OF SYMBOL FROM SEARCHING DATA STORING PORTION 41
S174 DISPLAY ADDITION INFORMATION+REPRODUCE CONTENT OF SEARCHING AUDIO DATA
S175 HAS REPRODUCING OPERATION BEEN DESIGNATED?
S176 ACCESS START ADDRESS CORRESPONDING TO SYMBOL ON DISC AND REPRODUCE CONTENT
S177 HAS POWER BEEN TURNED OFF?
S181 HAS POWER BEEN TURNED ON?
S182 DISPLAY CONTENT IN STORED SEARCHING MODE
S183 HAS LEFT SWITCH OF JOG BEEN TURNED ON?
S184 SWITCH DATA AREA TO NEXT DATA AREA
S185 HAS RIGHT SWITCH OF JOG BEEN TURNED ON?
S186 SWITCH SEARCHING MODE TO NEXT SEARCHING MODE
S187 HAS JOG BEEN ROTATED IN FORWARD DIRECTION?
S188 MOVE SELECTION CURSOR TO NEXT POSITION
S189 HAS JOG BEEN ROTATED IN BACKWARD DIRECTION?
S190 MOVE SELECTING CURSOR TO PREVISION POSITION
S191 HAS JOB PRESSING SWITCH BEEN PRESSED?
S192 START REPRODUCING SELECTED CONTENT
S193 HAS POWER SWITCH BEEN TURNED OFF?
S194 STORE CURRENT SEARCHING MODE TO MEMORY
S195 TURN OFF POWER

The invention claimed is:

1. A reproducing apparatus, comprising:
a display controller for:
controlling a display to display symbols corresponding to audio or video data, and
adjusting a size of the symbols or a display quality of the symbols based on a reproducing frequency for the audio or video data;
a designating unit for designating a symbol displayed on said display so as to designate desired data;
a reproducing unit for reproducing a part of said desired data designated by a first designation from a storage; and
a controller configured to cause said reproducing unit to reproduce said desired data from the beginning according to a second designation of said designating unit.

2. The reproducing apparatus according to claim 1, wherein the display controller adjusts a location of the symbols on the display based on a rhythm and an amplitude for the audio or video data.

3. The reproducing apparatus according to claim 1, wherein said reproducing unit reproduces the beginning portion of the audio or video data as the part of said desired data according to the first designation.

4. The reproducing apparatus according to claim 1, wherein said reproducing unit reproduces the bridge portion of the audio or video data as the part of said desired data according to the first designation.

5. A reproducing method, comprising the steps of:
controlling a display to display symbols corresponding to audio or video data;
adjusting a size of the symbols or a display quality of the symbols based on a reproducing frequency for the audio or video data;
designating a symbol displayed on said display so as to designate desired data;
reproducing a part of said desired data designated by a first designation from a storage; and
reproducing said desired data from the beginning according to a second designation.

6. The reproducing method according to claim 1, further comprising adjusting a location of the symbols on the display based on a rhythm and an amplitude for the audio or video data.

7. The reproducing method according to claim 1, wherein the beginning portion of the audio or video data is reproduced as the part of said desired data according to the first designation.

8. The reproducing method according to claim 1, wherein the bridge portion of the audio or video data is reproduced as the part of said desired data according to the first designation.

9. A computer-readable medium on which a program that causes a computer to execute a reproducing method is stored, the method comprising the steps of:
controlling a display to display symbols corresponding to audio or video data;
adjusting the size of a symbols or a display quality of the symbols based on at least one of a reproducing frequency, a rhythm, and an amplitude for the audio or video data;
designating a symbol displayed on said display so as to designate desired data;
reproducing a part of said desired data designated by a first designation from a storage; and
reproducing said desired data from the beginning according to a second designation.

10. The computer-readable medium according to claim 9, wherein the method further comprises adjusting a location of the symbols on the display based on a rhythm and an amplitude for the audio or video data.

11. The computer-readable medium according to claim 9, wherein the beginning portion of the audio or video data is reproduced as the part of said desired data according to the first designation.

12. The reproducing method according to claim 9, wherein the bridge portion of the audio or video data is reproduced as the part of said desired data according to the first designation.

* * * * *

UNITED STATES PATENT AND TRADEMARK OFFICE
CERTIFICATE OF CORRECTION

| | | |
|---|---|---|
| PATENT NO. | : 7,719,929 B2 | Page 1 of 1 |
| APPLICATION NO. | : 11/798596 | |
| DATED | : May 18, 2010 | |
| INVENTOR(S) | : Akira Tange et al. | |

It is certified that error appears in the above-identified patent and that said Letters Patent is hereby corrected as shown below:

On the Title Page, Item (57), in the Abstract, line 9, "data that are" should read --data are--.

*In claim 6, column 26, line 40, "claim 1," should read --claim 5,--.

*In claim 7, column 26, line 44, "claim 1," should read --claim 5,--.

*In claim 8, column 26, line 48, "claim 1," should read --claim 5,--.

In claim 9, column 26, line 56, "size of a symbols" should read --size of the symbols--.

Signed and Sealed this

Fifth Day of October, 2010

David J. Kappos
*Director of the United States Patent and Trademark Office*